US011729654B2

(12) United States Patent
Bachu et al.

(10) Patent No.: US 11,729,654 B2
(45) Date of Patent: Aug. 15, 2023

(54) COMMUNICATION TECHNIQUES BETWEEN A RADIO UNIT AND A DISTRIBUTED UNIT VIA AN APPLICATION PROGRAMMING INTERFACE

(71) Applicant: QUALCOMM incorporated, San Diego, CA (US)

(72) Inventors: Raja Sekhar Bachu, Kendall Park, NJ (US); Doohyun Sung, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/308,540

(22) Filed: May 5, 2021

(65) Prior Publication Data

US 2022/0361025 A1 Nov. 10, 2022

(51) Int. Cl.
| | |
|---|---|
| *H04W 24/10* | (2009.01) |
| *H04W 28/02* | (2009.01) |
| *H04W 8/24* | (2009.01) |
| *H04W 72/21* | (2023.01) |
| *H04W 72/23* | (2023.01) |

(52) U.S. Cl.
CPC ............ *H04W 24/10* (2013.01); *H04W 8/24* (2013.01); *H04W 28/0215* (2013.01); *H04W 72/21* (2023.01); *H04W 72/23* (2023.01)

(58) Field of Classification Search
CPC ... H04W 24/10; H04W 8/24; H04W 28/0215; H04W 72/0413; H04W 72/042
See application file for complete search history.

(56) References Cited

U.S. PATENT DOCUMENTS

| | | | | |
|---|---|---|---|---|
| 11,304,109 | B1* | 4/2022 | Potharaju | H04W 76/15 |
| 11,528,683 | B2* | 12/2022 | Rhim | H04L 27/2602 |
| 2017/0373890 | A1* | 12/2017 | Fertonani | H04L 9/40 |
| 2019/0274064 | A1* | 9/2019 | Chapman | H04W 28/0289 |
| 2020/0163044 | A1* | 5/2020 | Bapat | H04L 25/0224 |
| 2020/0235788 | A1* | 7/2020 | Rajagopal | H04B 7/0848 |
| 2020/0260471 | A1* | 8/2020 | Jeon | H04W 72/1268 |
| 2021/0007039 | A1* | 1/2021 | Salahuddeen | H04W 92/20 |
| 2021/0014912 | A1* | 1/2021 | Song | H04W 76/12 |
| 2021/0029562 | A1* | 1/2021 | Notargiacomo | H04W 12/67 |
| 2021/0120527 | A1* | 4/2021 | Rhim | H04W 72/0446 |

(Continued)

*Primary Examiner* — Chi H Pham
*Assistant Examiner* — Vladislav Y Agureyev
(74) *Attorney, Agent, or Firm* — Holland & Hart LLP/Qualcomm Incorporated

(57) ABSTRACT

Methods, systems, and devices for wireless communications are described. A remote unit (RU) of a base station may report, to a distributed unit (DU) of the base station, a message indicating that the RU supports an RU processing capability that is one of a first processing capability or a second processing capability. The first processing capability corresponds to additional physical layer signal processing at the RU than does the second processing capability. The RU may receive one or more uplink signals from a user equipment (UE) or accept one or more downlink signals from the DU, or both and process the one or more signals in accordance with the RU processing capability. The RU may forward the processed uplink signals from the RU to the DU via an application programming interface (API) that supports both the first processing capability and the second processing capability (e.g., a generalized API).

31 Claims, 12 Drawing Sheets

(56) References Cited

U.S. PATENT DOCUMENTS

| | | | | |
|---|---|---|---|---|
| 2021/0274405 | A1* | 9/2021 | Raghothaman | H04W 36/0085 |
| 2021/0377116 | A1* | 12/2021 | Yeh | H04W 24/10 |
| 2021/0385682 | A1* | 12/2021 | Bedekar | G06N 3/105 |
| 2021/0390004 | A1* | 12/2021 | Kundu | G06F 9/545 |
| 2021/0392657 | A1* | 12/2021 | Ahmed | H04L 47/30 |
| 2022/0014963 | A1* | 1/2022 | Yeh | G06N 3/0445 |
| 2022/0021423 | A1* | 1/2022 | Ahmed | H04B 7/0617 |
| 2022/0046637 | A1* | 2/2022 | Abedini | H04W 8/24 |
| 2022/0078631 | A1* | 3/2022 | Salahuddeen | H04W 28/0815 |
| 2022/0078643 | A1* | 3/2022 | Vierimaa | H04B 17/15 |
| 2022/0086818 | A1* | 3/2022 | Nam | H04W 72/046 |
| 2022/0086890 | A1* | 3/2022 | Kim | H04W 8/26 |
| 2022/0167236 | A1* | 5/2022 | Melodia | H04W 28/0236 |
| 2022/0279535 | A1* | 9/2022 | Tsui | H04L 41/16 |
| 2022/0295309 | A1* | 9/2022 | Akhtar | H04W 64/00 |

* cited by examiner

COMMUNICATION TECHNIQUES BETWEEN A RADIO UNIT AND A DISTRIBUTED UNIT VIA AN APPLICATION PROGRAMMING INTERFACE

FIELD OF TECHNOLOGY

The following relates to wireless communications, including communication techniques between a radio unit (RU) and a distributed unit (DU) via an application programming interface (API).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may support an open radio access network (O-RAN) architecture, network access nodes, such as base stations, may have functionality that is split among multiple units. For example, a base station may include a central unit (CU), one or more distributed units (DUs) and one or more radio heads or radio units (RUs), which may allow for enhanced network functionality such as efficient coordinated multipoint (CoMP) communications techniques, multiple-input-multiple-output (MIMO) techniques, and the like. Techniques for supporting the O-RAN architecture, however, may be deficient.

SUMMARY

The described techniques relate to improved methods, systems, devices, and apparatuses that support communication techniques between a radio unit (RU) and a distributed unit (DU) via an application programming interface. Generally, the described techniques provide for improved methods for supporting functional splits between an RU of a base station and of a DU of the base station. For example, an RU of a base station may report, to a DU of the base station, a message indicating that the RU supports an RU processing capability that is one of a first processing capability (e.g., a first functional split) or a second processing capability (e.g., a second functional split). The first processing capability corresponds to additional physical layer signal processing at the RU than does the second processing capability. For example, an RU that is capable of the first processing capability may support high physical (PHY) layer processing, low PHY layer processing, and radio frequency (RF) layer processing, whereas an RU that is capable of the second processing capability may support low PHY processing, and RF processing. A DU may determine to communicate with the RU based on the processing capability of the RU. The RU may receive one or more uplink signals from a user equipment (UE) and process the one or more uplink signals in accordance with the RU processing capability. The processing may result in one or more processed uplink signals. The RU may forward the one or more processed uplink signals to the DU via an application programming interface (API) that supports both the first processing capability and the second processing capability (e.g., a generalized API). In some cases, the DU may perform additional processing of the uplink signals. In some cases, the RU may accept one or more downlink signals from the DU and process the one or more downlink signals in accordance with the RU processing capability. The RU may transmit the one or more processed downlink signals to a UE.

A method for wireless communications at a RU of a base station is described. The method may include reporting, from the RU to a DU of the base station, a message indicating that the RU supports a RU processing capability that is one of a first processing capability or a second processing capability, where the first processing capability corresponds to additional physical layer signal processing at the RU than does the second processing capability, processing one or more signals in accordance with the RU processing capability included in the message transmitted to the DU, the processing resulting in one or more processed signals, where at least a first portion of the one or more processed signals results from processing of uplink signals of the one or more signals, and forwarding the first portion of the one or more processed signals as corresponding one or more processed uplink signals from the RU to the DU via an application programming interface that supports both the first processing capability and the second processing capability.

An apparatus for wireless communications is described. The apparatus may include a processor, memory coupled with the processor, and instructions stored in the memory. The instructions may be executable by the processor to cause the apparatus to reporting, from the RU to a distribute unit of the base station, a message indicating that the RU supports a RU processing capability that is one of a first processing capability or a second processing capability, where the first processing capability corresponds to additional physical layer signal processing at the RU than does the second processing capability, process one or more signals in accordance with the RU processing capability included in the message transmitted to the DU, the processing resulting in one or more processed signals, where at least a first portion of the one or more processed signals results from processing of uplink signals of the one or more signals, and forward the first portion of the one or more processed signals as corresponding one or more processed uplink signals from the RU to the DU via an application programming interface that supports both the first processing capability and the second processing capability.

Another apparatus for wireless communications is described. The apparatus may include means for reporting, from the RU to a DU of the base station, a message indicating that the RU supports a RU processing capability that is one of a first processing capability or a second processing capability, where the first processing capability corresponds to additional physical layer signal processing at the RU than does the second processing capability, means for processing one or more signals in accordance with the RU processing capability included in the message transmitted to the DU, the processing resulting in one or more processed signals, where at least a first portion of the one or more processed signals results from processing of uplink signals of the one or more signals, and means for forwarding the first portion of the one or more processed signals as corresponding one or more processed uplink signals from the RU to the DU via an application programming interface that supports both the first processing capability and the second processing capability.

A non-transitory computer-readable medium storing code for wireless communications is described. The code may include instructions executable by a processor to reporting, from the RU to a distribute unit of the base station, a message indicating that the RU supports a RU processing capability that is one of a first processing capability or a second processing capability, where the first processing capability corresponds to additional physical layer signal processing at the RU than does the second processing capability, process one or more signals in accordance with the RU processing capability included in the message transmitted to the DU, the processing resulting in one or more processed signals, where at least a first portion of the one or more processed signals results from processing of uplink signals of the one or more signals, and forward the first portion of the one or more processed signals as corresponding one or more processed uplink signals from the RU to the DU via an application programming interface that supports both the first processing capability and the second processing capability.

In some examples of the method, apparatuses, and non-transitory computer-readable medium described herein, forwarding the one or more processed uplink signals may include operations, features, means, or instructions for sending an indication of frequency domain momentary amplitude samples (I/Q samples) associated with the one or more uplink signals, where the one or more uplink signals may be received via one or more antennas and the indication includes a frequency domain I/Q sample per antenna of the one or more antennas, and where the application programming interface supports transmission of the indication in accordance with either the first processing capability or the second processing capability.

In some examples of the method, apparatuses, and non-transitory computer-readable medium described herein, forwarding the one or more processed uplink signals may include operations, features, means, or instructions for sending an indication of frequency domain channel estimates associated with the one or more uplink signals, where the one or more uplink signals may be received via one or more antennas and the indication includes a frequency domain channel estimate per antenna of the one or more antennas, and where the application programming interface supports transmission of the indication in accordance with the first processing capability.

In some examples of the method, apparatuses, and non-transitory computer-readable medium described herein, forwarding the one or more processed uplink signals may include operations, features, means, or instructions for sending an indication of a signal-to-noise ratio, a rank, timing advance information, or a combination thereof associated with each of the one or more processed uplink signals, where the application programming interface supports transmission of the indication in accordance with the first processing capability.

In some examples of the method, apparatuses, and non-transitory computer-readable medium described herein, forwarding the one or more processed uplink signals may include operations, features, means, or instructions for sending an indication of a list of UEs, a precoding matrix, a digital beamforming matrix, or a combination thereof associated with each of the one or more processed uplink signals, where the application programming interface supports transmission of the indication in accordance with the first processing capability.

In some examples of the method, apparatuses, and non-transitory computer-readable medium described herein, forwarding the one or more processed uplink signals may include operations, features, means, or instructions for sending an indication of a reference signal received power, a signal-to-noise ratio, or a combination thereof associated with each of the one or more processed uplink signals, where the application programming interface supports transmission of the indication in accordance with the first processing capability.

In some examples of the method, apparatuses, and non-transitory computer-readable medium described herein, forwarding the one or more processed uplink signals may include operations, features, means, or instructions for sending an indication of a reference signal received power, a timing advance, an angle of arrival, or a combination thereof associated with a UE, where the application programming interface supports transmission of the indication in accordance with the first processing capability.

In some examples of the method, apparatuses, and non-transitory computer-readable medium described herein, forwarding the one or more processed uplink signals may include operations, features, means, or instructions for sending an indication of pre-filtered frequency domain momentary amplitude samples (I/Q samples) associated with the one or more processed uplink signals, where the application programming interface supports transmission of the indication in accordance with the second processing capability.

In some examples of the method, apparatuses, and non-transitory computer-readable medium described herein, forwarding the one or more processed uplink signals may include operations, features, means, or instructions for sending an indication of a demodulated log-likelihood ratios associated with the one or more processed uplink signals, where each demodulated log-likelihood ratio may be associated with a physical layer, and where the application programming interface supports transmission of the indication in accordance with the second processing capability.

In some examples of the method, apparatuses, and non-transitory computer-readable medium described herein, processing the one or more signals may include operations, features, means, or instructions for determining, in accordance with either the first processing capability or the second processing capability, a channel estimation in a frequency domain, a signal-to-noise ratio, a reference signal received power, a timing advance, an angle of arrival, a rank, or a combination thereof based on the one or more uplink signals.

Some examples of the method, apparatuses, and non-transitory computer-readable medium described herein may further include operations, features, means, or instructions for determining the channel estimation for each of the one or more uplink signals may be based on a codebook based precoding matrix, or a non-codebook based precoding matrix, in accordance with the first processing capability.

In some examples of the method, apparatuses, and non-transitory computer-readable medium described herein, processing the one or more signals may include operations, features, means, or instructions for performing, in accordance with the second processing capability, pre-filtering, digital beamforming, or both for each of the one or more uplink signals based on one or more processing coefficients, where the one or more processing coefficients include pre-filtering coefficients or digital beamforming coefficients.

In some examples of the method, apparatuses, and non-transitory computer-readable medium described herein, processing the one or more signals may include operations, features, means, or instructions for performing, in accordance with the second processing capability, coherent combining across the one or more uplink signals.

Some examples of the method, apparatuses, and non-transitory computer-readable medium described herein may further include operations, features, means, or instructions for receiving one or more reference signals, where processing the one or more signals may be in accordance with the first processing capability and may be based on receiving the one or more reference signals, the one or more reference signals being one or more demodulation reference signals (DMRSs) or one or more sounding reference signals (SRSs).

Some examples of the method, apparatuses, and non-transitory computer-readable medium described herein may further include operations, features, means, or instructions for receiving one or more uplink shared channel transmissions, or one or more random access channel transmissions, where processing the one or more signals may be in accordance with the second processing capability and may be based on receiving the one or more uplink shared channel transmissions, or one or more random access channel transmissions, respectively.

Some examples of the method, apparatuses, and non-transitory computer-readable medium described herein may further include operations, features, means, or instructions for accepting one or more downlink signals from the DU of the base station, processing the one or more downlink signals in accordance with the RU processing capability included in the message transmitted to the DU based on a type of the one or more downlink signals, the RU processing capability, or both, where the one or more processed signals includes at least a second portion that results from the processing of the one or more downlink signals, and transmitting the second portion of the one or more processed signals as one or more processed downlink signals from the RU to the DU.

In some examples of the method, apparatuses, and non-transitory computer-readable medium described herein, the one or more downlink signals include one or more of a downlink shared channel transmission, a downlink control channel transmission, a broadcast channel transmission, and processing the one or more downlink signals may include operations, features, means, or instructions for processing the one or more downlink signals by encoding, precoding, applying transmit diversity, or a combination thereof to the one or more downlink signals based on the RU processing capability.

In some examples of the method, apparatuses, and non-transitory computer-readable medium described herein, the one or more downlink signals include one or more of a primary synchronization signal (PSS), a secondary synchronization signal (SSS), a channel state information reference signal (CSI-RS), and processing the one or more downlink signals may include operations, features, means, or instructions for processing the one or more downlink signals using sequence generation, precoding, applying transmit diversity, or a combination thereof to the one or more downlink signals based on the RU processing capability.

In some examples of the method, apparatuses, and non-transitory computer-readable medium described herein, the first processing capability includes support for processing at a higher physical layer, a lower physical layer, and a radio frequency layer at the RU and the second processing capability includes support for processing at the lower physical layer, and the radio frequency layer at the RU.

In some examples of the method, apparatuses, and non-transitory computer-readable medium described herein, the application programming interface supports one or more additional processing capabilities associated with at least one of medium access control (MAC) layer processing, remote link control (RLC) layer processing, or packet data convergence protocol (PDCP) layer processing.

A method for wireless communications is described. The method may include accepting, at the DU and from a RU of the base station, a message indicating that the RU supports a RU processing capability that is one of a first processing capability or a second processing capability, where the first processing capability corresponds to additional physical layer signal processing at the RU than does the second processing capability, determining to communicate with the RU based on the RU processing capability, accepting, at the DU, one or more processed uplink signals from the RU via an application programming interface that supports both the first processing capability and the second processing capability, and forwarding, to the RU, one or more processed downlink signals via the application programming interface.

An apparatus for wireless communications is described. The apparatus may include a processor, memory coupled with the processor, and instructions stored in the memory. The instructions may be executable by the processor to cause the apparatus to accept, at the DU and from a RU of the base station, a message indicating that the RU supports a RU processing capability that is one of a first processing capability or a second processing capability, where the first processing capability corresponds to additional physical layer signal processing at the RU than does the second processing capability, determine to communicate with the RU based on the RU processing capability, accept, at the DU, one or more processed uplink signals from the RU via an application programming interface that supports both the first processing capability and the second processing capability, and forwarding, to the RU, one or more processed downlink signals via the application programming interface.

Another apparatus for wireless communications is described. The apparatus may include means for accepting, at the DU and from a RU of the base station, a message indicating that the RU supports a RU processing capability that is one of a first processing capability or a second processing capability, where the first processing capability corresponds to additional physical layer signal processing at the RU than does the second processing capability, means for determining to communicate with the RU based on the RU processing capability, means for accepting, at the DU, one or more processed uplink signals from the RU via an application programming interface that supports both the first processing capability and the second processing capability, and means for forwarding, to the RU, one or more processed downlink signals via the application programming interface.

A non-transitory computer-readable medium storing code for wireless communications is described. The code may include instructions executable by a processor to accept, at the DU and from a RU of the base station, a message indicating that the RU supports a RU processing capability that is one of a first processing capability or a second processing capability, where the first processing capability corresponds to additional physical layer signal processing at the RU than does the second processing capability, determine to communicate with the RU based on the RU processing capability, accept, at the DU, one or more processed uplink signals from the RU via an application programming interface that supports both the first processing capability and the second processing capability, and forwarding, to the RU, one or more processed downlink signals via the application programming interface.

In some examples of the method, apparatuses, and non-transitory computer-readable medium described herein, accepting the one or more processed uplink signals may include operations, features, means, or instructions for accepting an indication of frequency domain momentary amplitude samples (I/Q samples) or channel estimates associated with the one or more uplink signals, where the indication includes a frequency domain I/Q sample or channel estimate per antenna of the RU, and where the application programming interface supports reception of the indication in accordance with either the first processing capability or the second processing capability.

In some examples of the method, apparatuses, and non-transitory computer-readable medium described herein, accepting the one or more processed uplink signals may include operations, features, means, or instructions for accepting an indication of a signal-to-noise ratio, a reference signal received power, a rank, timing advance information, a list of UEs, a precoding matrix, a digital beamforming matrix, or a combination thereof associated with each of the one or more processed uplink signals, where the application programming interface supports reception of the indication in accordance with the first processing capability.

In some examples of the method, apparatuses, and non-transitory computer-readable medium described herein, accepting the one or more processed uplink signals may include operations, features, means, or instructions for accepting an indication of a reference signal received power, a timing advance, an angle of arrival, or a combination thereof associated with the UE, where the application programming interface supports reception of the indication in accordance with the first processing capability.

In some examples of the method, apparatuses, and non-transitory computer-readable medium described herein, accepting the one or more processed uplink signals may include operations, features, means, or instructions for accepting an indication of pre-filtered frequency domain momentary amplitude samples (I/Q samples) associated with the one or more processed uplink signals, where the application programming interface supports reception of the indication in accordance with the second processing capability.

In some examples of the method, apparatuses, and non-transitory computer-readable medium described herein, accepting the one or more processed uplink signals may include operations, features, means, or instructions for accepting an indication of a demodulated log-likelihood ratios associated with the one or more processed uplink signals, where each demodulated log-likelihood ratio may be associated with a physical layer, and where the application programming interface supports reception of the indication in accordance with the second processing capability.

Some examples of the method, apparatuses, and non-transitory computer-readable medium described herein may further include operations, features, means, or instructions for processing the one or more processed uplink signals in accordance with the RU processing capability included in the message received from the RU, where the RU processing capability may be the first processing capability.

Some examples of the method, apparatuses, and non-transitory computer-readable medium described herein may further include operations, features, means, or instructions for performing demodulation and decoding of the of the one or more processed uplink signals in accordance with the second processing capability.

In some examples of the method, apparatuses, and non-transitory computer-readable medium described herein, the one or more processed uplink signals may be based on the RU processing capability, a fronthaul capacity, a signaling type associated with the one or more processed uplink signals, or a combination thereof.

In some examples of the method, apparatuses, and non-transitory computer-readable medium described herein, the signaling type may be a DMRS, a SRS, an uplink shared channel transmission, a random access channel transmission, a downlink shared channel transmission, a downlink control channel transmission, a broadcast channel transmission, a PSS, an SSS, a CSI-RS, or a combination thereof.

DETAILED DESCRIPTION

Figure 1:
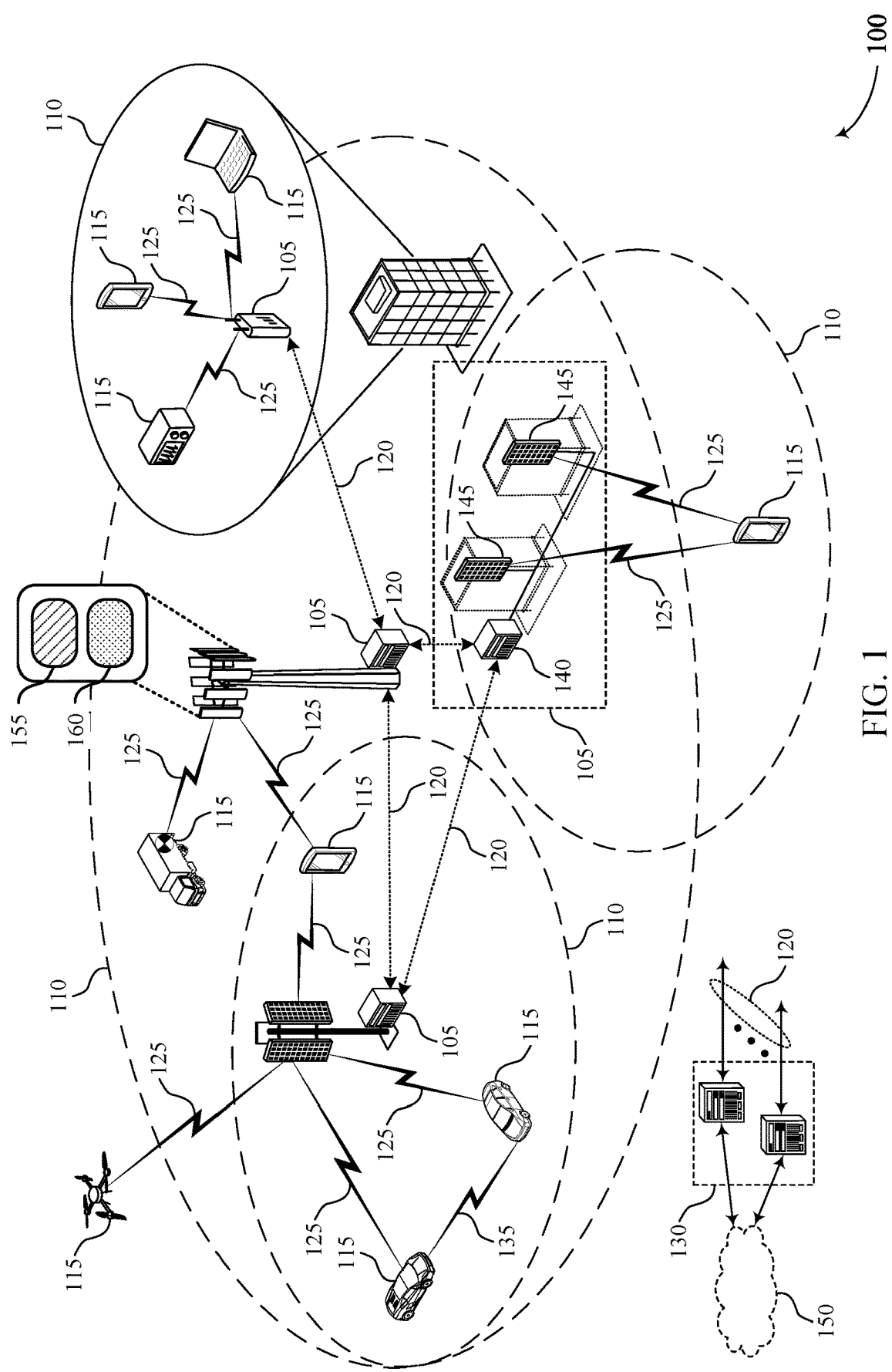
FIG. 1 illustrates an example of a wireless communications system that supports communication techniques between a radio unit (RU) and a distributed unit (DU) via an application programming interface (API) in accordance with aspects of the present disclosure.

In some communications systems, network access nodes, such as base stations (e.g., eNBs in 5G networks), may have functionality that is split among multiple units. For example, a base station may include a central unit (CU) and one or more remote units, which may allow for enhanced network functionality such as efficient coordinated multipoint (CoMP) communications techniques, multiple-input-multiple-output (MIMO) techniques, and the like. In some cases, functionality of a base station may be divided among a CU, one or more distributed units (DUs), and one or more radio units (RUs) (e.g., radio heads, remote units), where communications between a CU and a DU may be referred to as midhaul communications and communications between a DU and an RU may be referred to as fronthaul communications. In different types of deployments, it may be beneficial to have certain functionality implemented differently between DUs and RUs.

For example, some network operators may deploy a radio access network (RAN) that uses a disaggregated RAN infrastructure architecture. In a disaggregated architecture, the RAN may be split into three areas of functionality corresponding to CU functions, DU functions, and RU functions. The split of functionality between the CU, DU and RU is flexible and as such gives rise to numerous permutations of different functionalities depending upon which functions (e.g., medium access control (MAC) functions, baseband functions, radio frequency (RF) functions, and any combinations thereof) are performed at the CU, DU, and RU. For example, a functional split of the protocol stack may be employed between a DU and an RU such that the DU may support one or more layers of the protocol stack and the RU may support one or more different layers of the protocol stack. Examples of functional splits are described with reference to FIG. 3. An application programming interface (API) may be used as a communications interface between the DU and the RU. In some cases, the API is configured based on a specific functional split being used between the DU and RU. Therefore, because a DU may manage multiple RUs the DU may be configured with multiple APIs based on the functional splits supported by each RU. Further, the ability of the DU to dynamically manage new RUs may be limited by the API functionality of the DU.

Various techniques as discussed herein provide for flexible configuration of a fronthaul split between an RU and DU. The techniques described herein provide for a generalized API that may be used to support multiple different functional splits between a DU and one or more RUs. The API may be configured to support communications between a DU and an RU regardless of the functional split between the DU and the RU. As such, the API architecture at a DU may be simplified and a DU may dynamically switch between functional splits to communicate with multiple RUs associated with different functional splits. The described techniques provide for efficient communication techniques between an RU and DU, where based on the functional split supported by an RU, the RU and/or the DU may determine the amount of signal processing the RU may perform and thus the type of signaling transmitted from the RU to the DU.

Particular aspects of the subject matter described herein may be implemented to realize one or more advantages. Such techniques may allow a communication equipment developer/manufacturer or network operator to efficiently deploy and configure portions of a RAN that may use disaggregated infrastructure. Further, reconfigurability of RUs and DUs may allow an operator to adjust a network deployment or move equipment within a network in an efficient and cost effective manner. The described techniques may support improvements in configuring RUs managed by a DU, in improving network flexibility and reliability, among other advantages. As such, supported techniques may include improved network operations and, in some examples, may promote network efficiencies, among other benefits.

Aspects of the disclosure are initially described in the context of wireless communications systems. Aspects are then described with reference to split options, and a process flow. Aspects of the disclosure are further illustrated by and described with reference to apparatus diagrams, system diagrams, and flowcharts that relate to communication techniques between an RU and a DU via an API.

FIG. 1 illustrates an example of a wireless communications system 100 that supports communication techniques between an RU and a DU via an API in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems, such as wireless communications system 100, may support an open radio access network (O-RAN) architecture, where network access nodes, such as base stations 105, may have functionality that is split among multiple units. For example, a base station may include a CU, one or more DUs 155 and one or more RUs 160, which may allow for enhanced network functionality such as efficient coordinated multipoint (CoMP) communications techniques, multiple-input-multiple-output (MIMO) techniques, and the like. In some cases, an RU 160 of a base station 105 may report, to a DU 155 of the base station, a message indicating that the RU 160 supports an RU processing capability that is one of a first processing capability (e.g., a first functional split) or a second processing capability (e.g., a second functional split). The first processing capability corresponds to additional physical layer signal processing at the RU 160 than does the second processing capability. For example, an RU 160 that is capable of the first processing capability may support a high PHY layer processing, low PHY layer processing, and radio frequency layer (RF) processing, whereas an RU 160 that is capable of the second processing capability may support low-PHY layer processing, and RF layer processing. A DU 155 may determine to communicate with the RU 160 based on the processing capability of the RU 160. The RU 160 may receive one or more uplink signals from a UE 115 and process the one or more uplink signals in accordance with the RU processing capability. The processing may result in one or more processed uplink signals. The RU 160 may forward the one or more processed uplink signals to the DU 155 via an API that supports both the first processing capability and the second processing capability (e.g., a generalized API). In some cases, the DU 155 may perform additional processing of the uplink signals. In some cases, the DU 155 may perform additional processing of the uplink signals. In some implementations, the RU 160 may accept one or more downlink signals from the DU 155 and process the one or more downlink signals in accordance with the RU 160 processing capability. The RU 160 may transmit the one or more processed downlink signals to a UE 115.

Figure 2:
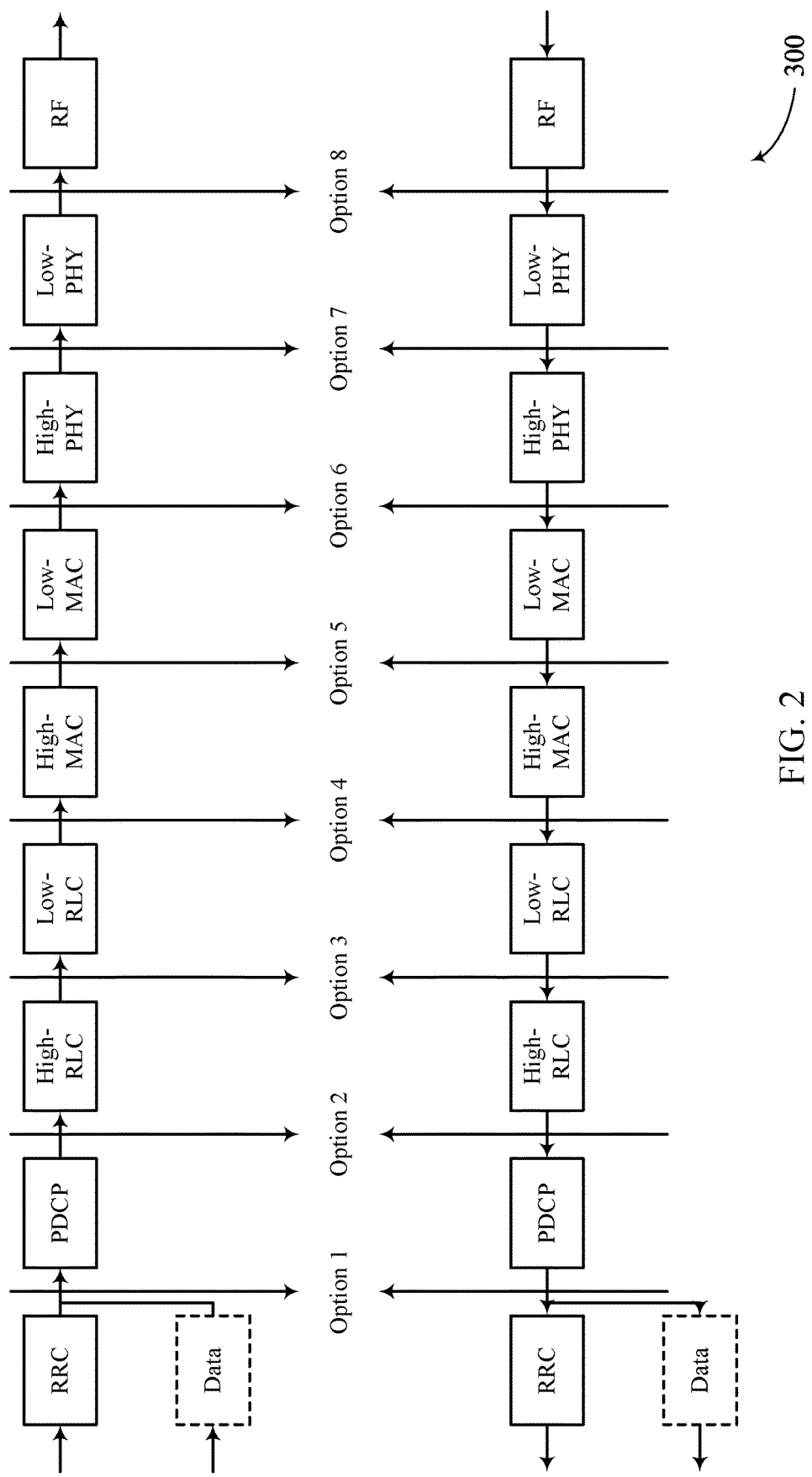
FIG. 2 illustrates an example of split options that supports communication techniques between an RU and a DU via an API in accordance with aspects of the present disclosure.

FIG. 2 illustrates an example of a split options 200 for protocol stack layers at RUs and DUs of a base station that supports communication techniques between an RU and a DU via an API in accordance with aspects of the present disclosure. The split options 200 illustrate different split options for splitting a base station functionality between RU functionality and DU functionality. The base station may be an example of a base station as described with reference to FIG. 1.

As described herein, in some wireless communications system, such as a RAN disaggregated network, the functions performed by a base station may be split between a DU and RU (e.g., a functional split between a DU and RU). In some examples, in which the split options 200 may illustrate splits between RU functionality and DU functionality, option 1 may provide an example of a protocol stack layer split such that a DU includes an RRC layer and an RU includes a PDCP layer, a high RLC layer, a low RLC layer, a high MAC layer, a low MAC layer, a high PHY layer, a low PHY layer, and a radio frequency layer. Similarly, option 2 may provide an example of a protocol stack layer split such that a DU includes an RRC layer and a PDCP layer, and an RU includes a high RLC layer, a low RLC layer, a high MAC layer, a low MAC layer, a high PHY layer, a low PHY layer, and a radio frequency layer. The remainder of options 3, 4, 5, 6, 7, and 8 also may illustrate splits between DU functionality and RU functionality. For example, option 6 (e.g., a first processing capability of the RU) may provide an example of a protocol stack layer split such that a DU includes an RRC layer, a PDCP layer, a high RLC layer, a low RLC layer, a high MAC layer, and a low MAC layer and an RU includes a high PHY layer, a low PHY layer, and a radio frequency layer. Option 7 (e.g., a second processing capability of the RU) may provide an example of a protocol stack layer split such that a DU includes an RRC layer, a PDCP layer, a high RLC layer, a low RLC layer, a high MAC layer, a low MAC layer, and a high PHY layer, and an RU includes a low PHY layer, and a radio frequency layer. Therefore, an RU operating according to option 6 may have greater processing capability than an RU operating according to option 7.

An API may be used as a communications interface between the DU and the RU. To enable flexible configuration of fronthaul split between RUs and DUs, the DU and/or RU may be configured with a generalized API that may be used to support multiple different functional splits, such that the generalized API may support communications between an RU and DU irrespective (e.g., regardless) of the function split between the RU and DU. As such, the API architecture at a DU, for example, may be simplified and a DU may dynamically switch between functional splits to communicate with multiple RUs associated with different functional splits. The described techniques provide for flexible communication techniques between an RU and DU, where based on the functional split supported by an RU, the DU may determine (e.g., dynamically) whether to communicate with the RU. Additionally, an RU and/or a DU may determine the amount of signal processing the RU may perform and thus the type of signaling transmitted from the RU to the DU based on the processing capability of the RU.

Figure 3:
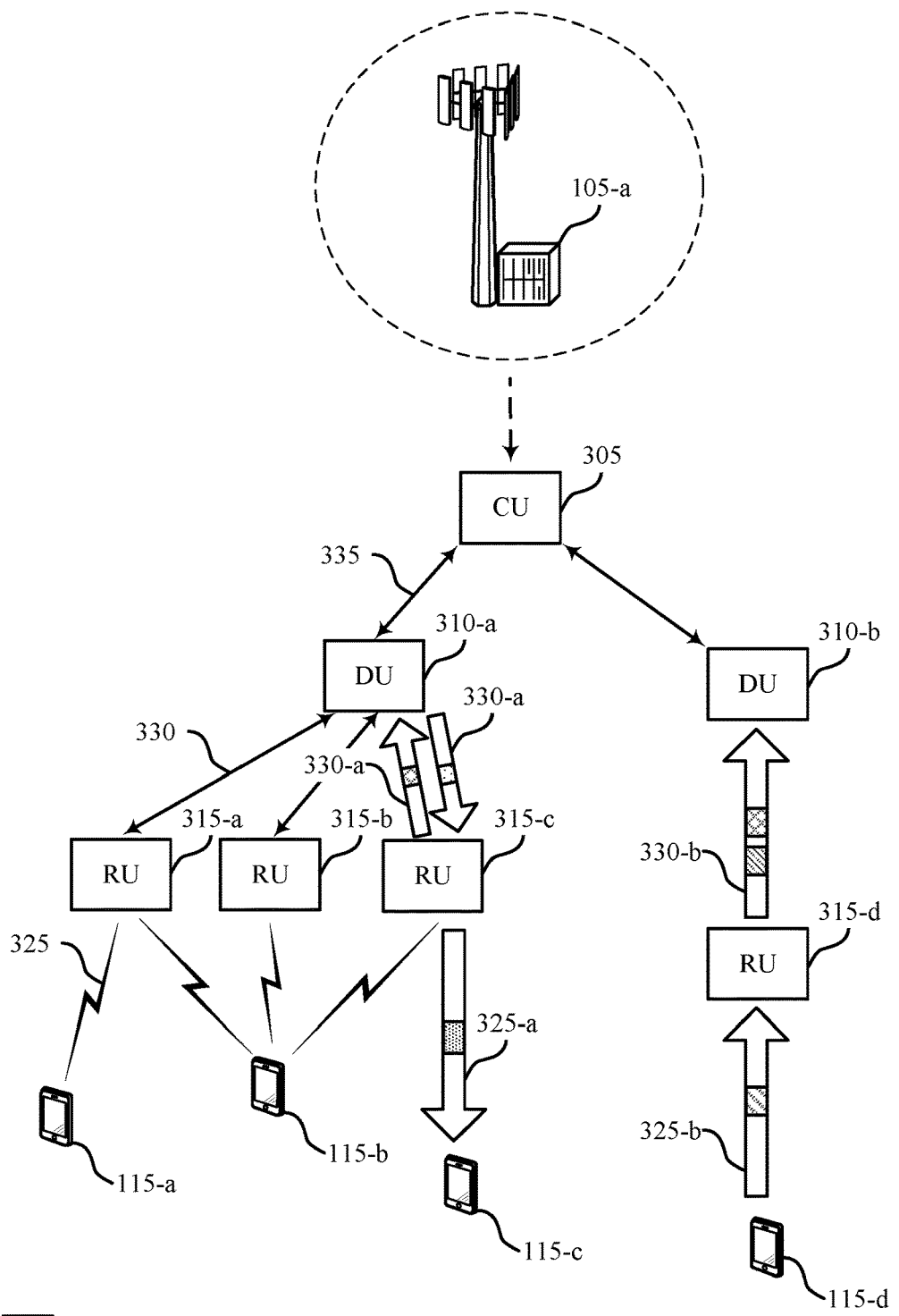
FIG. 3 illustrates an example of a wireless communications system that supports communication techniques between an RU and a DU via an API in accordance with aspects of the present disclosure.

FIG. 3 illustrates an example of a wireless communication system 300 that supports communication techniques between an RU and a DU via an API in accordance with aspects of the present disclosure. Wireless communication system 300 may implement aspects of wireless communication system 100. Wireless communication system 300 may include base station 105-a and one or more UEs 115 (e.g., UEs 115-a, 115-b, 115-c, and 115-d), which may be examples of the corresponding devices described herein. Base station 105 may include a CU 305, one or more DUs 310, and/or one or more RUs 315, which may be examples of the corresponding devices described herein. For example, CU 305, DUs 310, and/or RUs 315 may be functions/components implemented at or implemented by base station 105-a.

In some aspects, wireless communication system 300 may be an example of a RAN, such as an O-RAN. Broadly, a RAN includes the link between the network and a UE 115, such as a link between a base station 105 and UE 115. In an O-RAN, network access nodes, such as base stations 105, may have functionality that is split among multiple units. For example, a base station 105 may include a CU 305 and one or more radio heads or RUs, which may allow for enhanced network functionality such as efficient CoMP communications techniques, MIMO techniques, and the like. In some cases, functionality of a base station 105 may be divided among a CU 305, one or more DUs 310, and one or more RUs 315, where communications between a CU 305 and a DU 310 may be referred to as midhaul communications (e.g., via a midhaul link 335) and communications between a DU 310 and an RU 315 may be referred to as fronthaul communications (e.g., via a fronthaul link 330). For example, base station 105-a may include at least CU 305, DUs 310-a and 310-b, and RUs 315-a, 315-b, 315-c, and 315-d. CU 305 may communicate with at least DUs 310-a and 310-b via a midhaul link 335. DU 310-a may communicate with at least RUs 315-a, 315-b, and 315-c via a fronthaul link 330, and DU 310-b may communicate with RU 315-d via a fronthaul link 330. Each RU 315 may communicate with one or more UEs 115. For example, RU 315-a may communicate with UEs 115-a and 115-b via a communications link 325 (e.g., a downlink communications link, an uplink communications link), RU 315-b may communicate with UE 115-b via a communications link 325, RU 315-c may communicate with UEs 115-b and 115-c via a communications link 325, and RU 315-d may communicate with UE 115-d via a communications link 325. The UEs 115 that an RU 315 communicates with may change dynamically, semi-statically, or aperiodically.

In some implementations, an RU 315 may be configured with a processing capability (e.g., a functional split as described with reference to FIG. 2). The processing capability of an RU 315 may be fixed in some cases, or may change dynamically, semi-statically, or aperiodically. For example, each of RUs 315-a, 315-b, 315-c, and 315-d may support a processing capability, such as a first processing capability (e.g., option 6 with reference to FIG. 2), or a second processing capability (e.g., option 7 with reference to FIG. 2). A DU 310 may determine (e.g., dynamically) whether to communicate with an RU 315 and determine the type of communications to perform with an RU 315 based on the current processing capability of the RU 315. For example, an RU 315 that supports a functional split according to option 7 may require a DU 310 to perform more signal processing compared to an RU 315 that supports a functional split according to option 6. Therefore, a DU 310 may determine whether to communicate with an RU 315 based on the amount of processing required to communicate with the RU 315, and the current capability of the DU 310 (e.g., current load of the DU 310). In some cases, a DU 310 may be communicating with multiple RUs 315 and may dynamically determine to cease communications with one or more of the RUs 315 based on the DU 310 becoming overloaded. In some cases, the DU 310 may cease communications with the one or more RUs 315 associated with lowest RU processing capability (e.g., option 7) of the multiple RUs 315. In some cases, the load of the DU 310 may decrease to a level such that the DU 310 may communicate with additional RUs 315. However, the DU 310 may determine which additional RUs 315 to communicate with (e.g., to manage) based on the processing capability of each of the additional RUs 315 so as not to become overloaded, for example.

As described herein, a unit of an O-RAN may be configured with a generalized API so as to allow the unit (e.g., a DU 310, and RU 315) to communicate with multiple units using the same API, where each of the multiple units may support a different processing capability. For example, DU 310-a may be configured with a generalized API and as such, DU 310-a may communicate with RU 315-a that may supports a first processing capability (e.g., option 6) and RU 315-b that may support a second processing capability (e.g., option 7) using a single API. A generalized API may allow a unit to dynamically and efficiently communicate with new units, and to communicate with units that support different processing capabilities while simplifying software implementation at the unit. In some cases, the generalized API may support one or more of the following functional splits: option 1, option 2, option 3, option 4, option 5, option 6, option 7, and option 8. For example, a generalized API may support all functional splits associated with options 1 through 8, or a generalized API may support a subset of the functional splits such as option 6 and option 7.

In some cases, a generalized API may refer to a DU-RU API that can be used (e.g., re-used) to support multiple split options. For example, an option 6 MAC-PHY API may be used for option 7, or vice versa. In an example, in the downlink, option 6 API messages may be interpreted as option 7 control plane messages. As such, an RU 315 may expect to additionally receive data plane messages. In an example, in the uplink, an RU 315 may determine the format of uplink channel indication messages to be either option 6 or option 7 based.

In some implementations, fronthaul throughput may impact the functional split between a DU 310 and an RU 315. For example, a DU 310 may determine whether to communicate with an RU 315 based on the associated fronthaul throughput associated with communications (e.g., amount of information communicated between the DU 310 and RU 315, amount of processing performed by the DU 310, amount of processing performed by the RU 315). In some cases, fronthaul throughput may impact a number of RUs 315 and DU 310 can manage, the load of the DU 310, etc. Fronthaul throughput may refer to an amount (e.g., size) of information communicated between an RU 315 and a DU 310 (e.g., in the uplink, or downlink, or both). Fronthaul throughput may be based on a type of information being communicated. For example, communications associated with reference signals (e.g., demodulated reference signals (DMRSs), sounding reference signals (SRSs)), uplink shared channel communications, communications associated with random access, etc. may be associated with high fronthaul throughput due to the amount of information associated with each type of communication, due to being unable to compress the information, etc.

Techniques described herein may configure an RU 315 to perform a level of signal processing (e.g., a level of signal processing in addition to that associated with a functional split) to reduce the size of information (e.g., data plane messages) in the uplink (e.g., the size of information forwarded to a DU 310 form an RU 315) or downlink. The level of signal processing an RU 315 may be configured to perform may be based on the functional split between a DU 310 and the RU 315, the capability of the RU 315, fronthaul capacity, capability of the DU 310 (e.g., bandwidth availability, resource availability), etc. In some cases, the RU 315 may determine the level of signal processing to perform. In some cases, a DU 310 may determine a level of signal processing for one or more RUs 315 to perform and indicate the level to each RU 315. The level of signal processing an RU 315 may perform may be configured dynamically, semi-statically, or aperiodically. In some cases, an RU 315 may be configured to transmit processing capability signaling to a DU 310, and the DU 310 may configure the RU 315 with a level of signal processing based on the processing capability of the RU 315.

For example, RU 315-d may transmit, to DU 310-d, processing capability information 320 of RU 315-d (e.g., an indication of the functional split supported by RU 315-d, loading information, etc.) via fronthaul link 330-b. RU 315-d may determine a level of processing and/or receiving an indication of a level of processing from DU 310-b. Accordingly, RU 315-d may receive one or more uplink signals 345 (e.g., SRSs, DMRSs, physical random access channel (PRACH) transmissions) from one or more UEs 115, such as UE 115-d (via communications link 325-b) and perform a level of signal processing (e.g., no signal processing, low level of signal processing, high level of signal processing) in accordance with the configuration of RU 315-d. RU 315-d may send, to DU 310-b, information associated with the one or more processed uplink signals, where the type and/or size of the information sent to DU 310-b may be based on the level of processing performed by RU 315-d. For example, RU 315-d may transmit processed uplink signals 340 to DU 310-b based on the processing capability of RU 315-d via fronthaul link 330-a.

In another example, RU 315-c may transmit, to DU 310-a, processing capability information 320 of RU 315-c (e.g., an indication of the functional split supported by RU 315-c, loading information, etc.) via fronthaul link 330-a. RU 315-c may determine a level of processing and/or receiving an indication of a level of processing from DU 310-b. Accordingly, RU 315-c may accept one or more downlink signals 355 (e.g., physical downlink shared channel (PDSCH) signals, physical downlink control channel (PDCCH) signals, physical broadcast channel (PBCH) signals, primary synchronization signals (PSSs), secondary synchronization signals (SSSs), CSI-RSs) from DU 310-a.

RU 315-c may perform a level of signal processing to the one or more downlink signals (e.g., no signal processing, low level of signal processing, high level of signal processing) in accordance with the configuration of RU 315-c. RU 315-c may transmit, to one or more UEs 115, information associated with the one or more processed downlink signals. For example, RU 315-c may transmit the one or more processed downlink signals 350 to UE 115-c based on the processing capability of RU 315-c via communications link 325-a.

In some implementations, such as regarding a level of signal processing associated with option 6, an RU 315 may be configured to send an indication of frequency domain momentary amplitude samples (I/Q samples) associated with the one or more uplink signals (e.g., SRSs, DMRSs) and/or downlink signals. For example, the RU 315 may receive the one or more uplink signals 345 via one or more antennas via one or more UEs 115 and as such, the indication may include a frequency domain I/Q sample per antenna of the one or more antennas and per UE 115, such that each I/Q sample is associated with one antenna and one UE 115. In some implementations, the RU 315 may determine one or more channel estimates associated with the one or more uplink signals 345 per antenna, and may send an indication of frequency domain channel estimates associated with the one or more uplink signals 345 per antenna and per UE 115. In some cases, the RU 315 may be configured to transmit both the I/Q samples and the channel estimates associated with the one or more uplink signals 345. The DU 310 may identify the I/Q samples and/or the channel estimates and perform signal processing of the uplink signals (e.g., DMRS, SRS) based on the I/Q samples and/or the channel estimates. In the downlink (assuming channel reciprocity), the DU 310 may use the I/Q samples and/or the channel estimates for massive MIMO operation, where the DU 310 may compute precoding and/or digital beamforming for downlink MU-MIMO operation.

In some implementations, such as regarding a level of signal processing associated with option 6, an RU 315 may be configured to determine (e.g., process) and send an indication of signal-to-noise ratio (SNR), corresponding rank, corresponding precoding, a timing advance, or a combination thereof based on one or more uplink signals 345 (e.g., SRSs, DMRSs) received by the RU 315. For example, the RU 315 may receive the one or more uplink signals 345 via one or more antennas via one or more UEs 115. The RU 315 may perform channel estimation and SNR calculation based on the one or more uplink signals 345. The RU 315 may perform channel and/SNR calculation based on a precoding matrix, where the precoding matric may be non-codebook based, or codebook based. The DU 310 may identify information from the RU 315 (e.g., SNR, corresponding rank, corresponding precoding, a timing advance, or a combination thereof). The DU 310 may perform additional signal processing of the uplink signals (e.g., DMRS, SRS) based on the information. In some cases, the DU 310 and/or the RU 315 may use the information for SU-MIMO physical uplink shared channel (PUSCH) transmissions.

In some implementations, such as regarding a level of signal processing associated with option 6, an RU 315 may be configured to determine (e.g., process) and send an indication of a list of UEs 115, a corresponding precoding beamforming matrix, a corresponding digital beamforming matrix, or a combination thereof based on one or more uplink signals (e.g., SRSs, DMRSs) received by the RU 315 during a TTI (e.g., slot). For example, the RU 315 may receive the one or more uplink signals 345 via one or more antennas via one or more UEs 115. The RU 315 may perform signal processing of the one or more uplink signals 345 (e.g., complete DMRS processing, complete SRS processing) to determine the list of UEs 115, the corresponding precoding beamforming matrix, the corresponding digital beamforming matric, or the combination thereof. The DU 310 may identify the information from the RU 315 (e.g., the list of UEs 115, the corresponding precoding beamforming matrix, the corresponding digital beamforming matric, or the combination thereof) and in some cases, the DU 310 and/or the RU 315 may use the information for downlink MU-MIMO transmissions. In some cases, the RU 315 may process and send the information for antenna switching. In some cases, the level of processing and the information sent to the DU 310 may be indicated in an SRS command and distinguished by a flag (e.g., such as for SRS antenna switching).

In some implementations, such as regarding a level of signal processing associated with option 6, an RU 315 may be configured to determine (e.g., process) and send an indication of an SNR, reference signal received power (RSRP), or a combination thereof based on one or more uplink signals 345 (e.g., SRSs, DMRSs) received by the RU 315. The RU 315 may determine and send the SNR and/or the RSRP per uplink signal 345 and per UE 115. For example, the RU 315 may receive the one or more uplink signals 345 via one or more antennas via one or more UEs 115, and as such each SNR and/or RSRP may be associated with one uplink signal 345 and one UE 115. The RU 315 may perform signal processing of the one or more uplink signals (e.g., complete DMRS processing, complete SRS processing) from each resource per UE 115 to determine the SNR, and RSRP. DU 310 may accept the one or more processed uplink signals 340 and identify the information from the RU 315 (e.g., SNR, RSRP, or a combination thereof) and in some cases, the DU 310 and/or the RU 315 may use the information for beam management (e.g., SRS beam management).

In some implementations, such as regarding a level of signal processing associated with option 6, an RU 315 may be configured to determine (e.g., process) and send an indication of an RSRP, timing advance, angle of arrival, or a combination thereof based on one or more uplink signals 345 (e.g., SRSs, DMRSs) received by the RU 315. The RU 315 may determine and send the RSRP, timing advance, and angle of arrival per uplink signal 345 and per UE 115. For example, the RU 315 may receive the one or more uplink signals via one or more antennas via one or more UEs 115, and as such each RSRP, timing advance, and angle of arrival may be associated with one uplink signal 345 and one UE 115. The RU 315 may perform signal processing of the one or more uplink signals (e.g., complete DMRS processing, complete SRS processing) per UE 115 to determine the RSRP, timing advance, angle of arrival. The DU 310 may identify the information from the RU 315 (e.g., RSRP, timing advance, angle of arrival, or a combination thereof) and in some cases, the DU 310 and/or the RU 315 may use the information for positioning (e.g., SRS positioning).

In some implementations, such as regarding a level of signal processing associated with option 7, an RU 315 may be configured to determine (e.g., process) and send an indication of I/Q samples (e.g., raw frequency domain I/Q samples) based on one or more uplink signals 345 (e.g., PUSCH transmissions) received by the RU 315. The RU 315 may determine and send the I/Q samples per antenna and per UE 115. For example, the RU 315 may receive the one or more uplink signals 345 via one or more antennas via one or more UEs 115, and as such each I/Q sample may be associated with one antenna and one UE 115. The DU 310 may identify the information from the RU 315 (e.g., the IQ samples) and perform uplink signal demodulation and decoding (e.g., PUSCH demodulation and decoding).

In some implementations, such as regarding a level of signal processing associated with option 7, an RU 315 may be configured to determine (e.g., process) and send an indication of pre-filtered I/Q samples (e.g., pre-filtered frequency domain I/Q samples), digital beamformed I/Q samples (e.g., digital beamformed frequency domain I/Q samples), or a combination thereof based on one or more uplink signals 345 (e.g., PUSCH transmissions) received by the RU 315. The RU 315 may determine and send the prefiltered and/or digital beamformed I/Q samples per uplink signal 345 and per UE 115. For example, the RU 315 may receive the one or more uplink signals 345 via one or more antennas via one or more UEs 115, and perform the pre-filtering, and/or digital beamforming for each received uplink signal 345. As such each pre-filtered and/or digital beamformed I/Q sample may be associated with one uplink signal 345 and one UE 115. The RU 315 may perform the pre-filtering and/or digital beamforming based on coefficients (e.g., prefiltering coefficients, digital beam forming coefficients, accordingly). In some cases, a DU 310 may send the coefficients to the RU 315, the RU 315 may autonomously determine the coefficients, or the RU 315 may be preconfigured with the coefficients. The DU 310 may identify the information from the RU 315 (e.g., the prefiltered and/or digital beamformed I/Q samples) and perform uplink signal demodulation and decoding (e.g., PUSCH demodulation and decoding) based on the information.

In some implementations, such as regarding a level of signal processing associated with option 7, an RU 315 may be configured to determine (e.g., process) and send an indication of demodulated log likelihood ratio (LLRs) based on one or more uplink signals 345 (e.g., PUSCH transmissions) received by the RU 315. The RU 315 may determine and send demodulated LLRs per layer and per UE 115. For example, the RU 315 may receive the one or more uplink signals 345 via one or more UEs 115 on one or more layers, and as such, each demodulated LLR may be associated with one UE 115 and one layer. The DU 310 may identify the information from the RU 315 (e.g., the demodulated LLRs) and perform uplink signal decoding (e.g., PUSCH decoding) based on the information.

In some implementations, such as regarding a level of signal processing associated with option 7, an RU 315 may be configured to determine (e.g., process) and send an indication of I/Q samples (e.g., raw frequency domain I/Q samples) based on one or more uplink signals 345 (e.g., PRACH transmissions) received by the RU 315. The RU 315 may determine and send the I/Q samples per antenna and per UE 115. For example, the RU 315 may receive the one or more uplink signals 345 via one or more antennas via one or more UEs 115, and as such each I/Q sample may be associated with one antenna and one UE 115. In some cases, the RU 315 may process the one or more uplink signals 345 by performing coherent combining across uplink repetitions (e.g., PRACH repetitions), where the one or more I/Q samples sent to the DU 310 may be based on the coherent combining. The DU 310 may identify the information from the RU 315 (e.g., the IQ samples) and perform preamble detection (e.g., PRACH preamble detection) based on the information.

In some implementations, such as regarding a level of signal processing associated with option 7, an RU 315 may be configured to determine (e.g., process) and send an indication of pre-filtered I/Q samples (e.g., pre-filtered frequency domain I/Q samples), digital beamformed I/Q samples (e.g., digital beamformed frequency domain I/Q samples), or a combination thereof based on one or more uplink signals 345 (e.g., PRACH transmissions) received by the RU 315. The RU 315 may determine and send the prefiltered and/or digital beamformed I/Q samples per uplink signal 345 and per UE 115. For example, the RU 315 may receive the one or more uplink signals 345 via one or more antennas via one or more UEs 115, and perform the pre-filtering, and/or digital beamforming for each received uplink signal 345. As such, each pre-filtered and/or digital beamformed I/Q sample may be associated with one uplink signal 345 and one UE 115. The RU 315 may perform the pre-filtering and/or digital beamforming based on coefficients (e.g., prefiltering coefficients, digital beam forming coefficients, accordingly). In some cases, a DU 310 may send the coefficients to the RU 315, the RU 315 may autonomously determine the coefficients, or the RU 315 may be preconfigured with the coefficients. In some cases, the RU 315 may process the one or more uplink signals 345 by performing coherent combining across uplink repetitions (e.g., PRACH repetitions), where the RU 315 may perform pre-filtering and/or digital beamforming based on the coherent combining. The DU 310 may identify the information from the RU 315 (e.g., prefiltered and/or digital beamformed IQ samples) and perform preamble detection (e.g., PRACH preamble detection) based on the information.

As described herein, an RU 315 may be configured to perform level of signal processing on one or more downlink signals before transmitting the one or more downlink signals to a UE 115. The processing may be based on a type of the one or more downlink signals (e.g., PDSCH, PDCCH, PBCH, PSS, SSS, CSI-RS), the RU processing capability (e.g., option 6, option 7), or both. In some implementations, such as regarding a level of signal processing associated with option 6, an RU 315 may process one or more downlink signals 355 (e.g., PDSCH, PDCCH, PBCH) by encoding, precoding, applying transmit diversity, or a combination thereof to the one or more downlink signals 355 based on the processing capability of the RU 315. For example, if the RU 315 supports option 6 and accepts one or more of a PDSCH, PDCCH, or PBCH transmission from a DU 310, the RU 315 may implement full PHY layer processing (e.g., low PHY layer processing, high PHY layer processing) starting with an encoder. If the RU 315 support option 7 and accepts one or more of a PDSCH, PDCCH, or PBCH transmission from a DU 310, the RU 315 may implement low PHY layer processing starting from precoding and/or transmit diversity application.

In some implementations, such as regarding a level of signal processing associated with option 6, an RU 315 may process one or more downlink signals 355 using sequence generation, precoding, applying transmit diversity, or a combination thereof the one or more downlink signals 355 based on the processing capability of the RU 315. For example, if the RU 315 supports option 6 and accepts one or more of a PSS, SSS, or CSI-RS from a DU 310, the RU 315 may implement full PHY layer processing starting from sequence generation. If the RU 315 supports option 7 and accepts one or more of a PSS, SSS, or CSI-RS from a DU 310, the RU 315 may implement low PHY layer processing starting from precoding or transmit diversity application.

Figure 4:
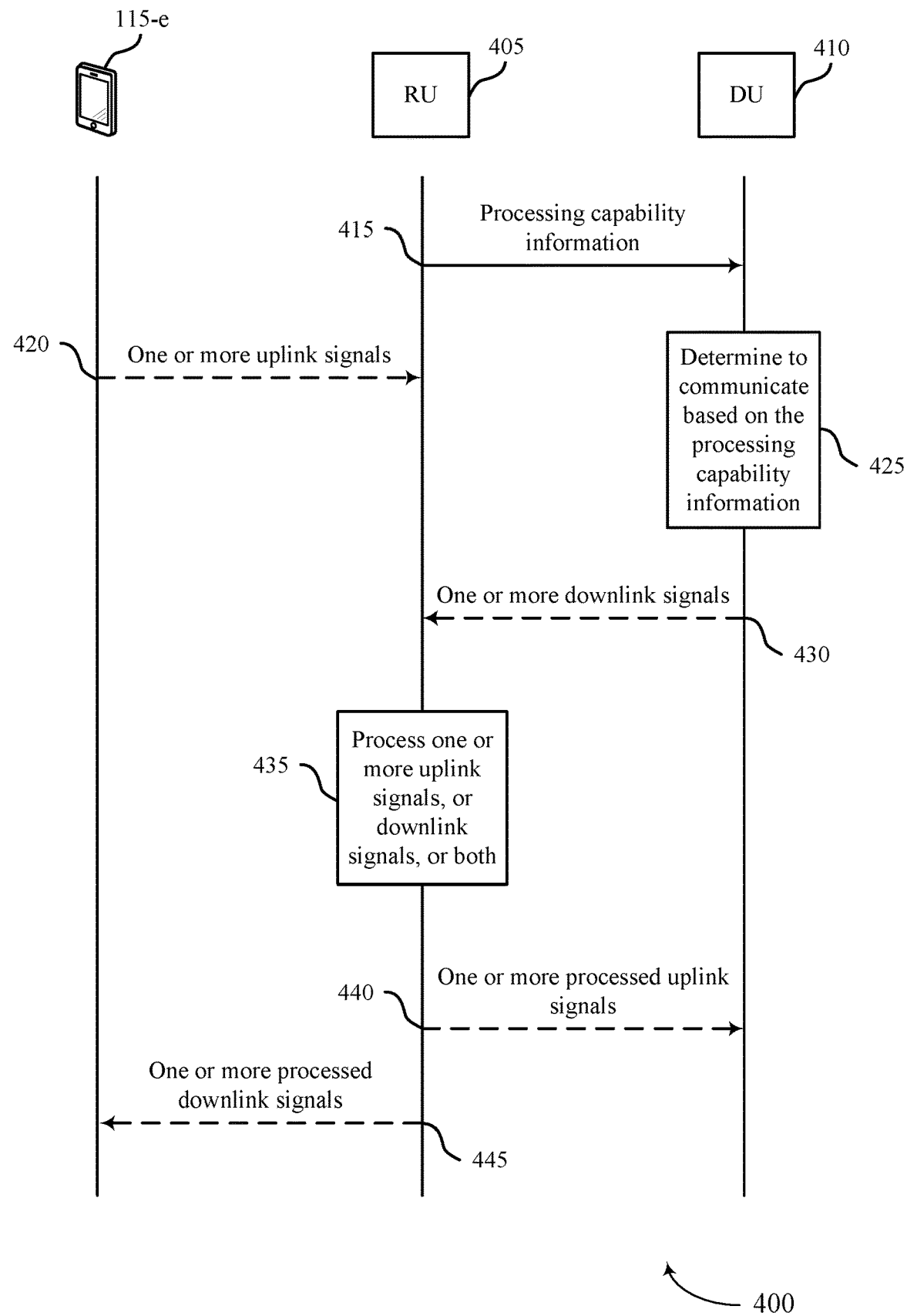
FIG. 4 illustrates an example of a process flow that supports communication techniques between an RU and a DU via an API in accordance with aspects of the present disclosure.

FIG. 4 illustrates an example of a process flow 400 that supports communication techniques between an RU and a DU via an API in accordance with aspects of the present disclosure. The process flow 400 may illustrate an example signal processing procedure. For example, RU 405 may perform a level of signal processing (e.g., no signal processing, low level of signal processing, high level of signal processing) on uplink signals from UE 115-e, and/or downlink signals from DU 410 and indicate information associated with the processed uplink signals to DU 410, and/or indicate information associated with the processed downlink signals to UE 115-e. UE 115-e, RU 405, and DU 410 may be examples of the corresponding wireless devices described with reference to FIGS. 1 through 3. Alternative examples of the following may be implemented, where some steps are performed in a different order than described or are not performed at all. In some cases, steps may include additional features not mentioned below, or further steps may be added.

At 415, an RU 405 of a base station may report, to a DU 410 of a base station, a message indicating that the RU 405 supports an RU processing capability that is one of a first processing capability or a second processing capability. The first processing capability may correspond to additional physical layer signal processing at the RU than does the second processing capability. The first processing capability may include support for processing at a higher physical layer, a lower physical layer, and a radio frequency layer at the RU 405 and the second processing capability may include support for processing at the lower physical layer, and the radio frequency layer at the RU.

In some cases, at 420, UE 115-b may transmit one or more uplink signals to RU 405.

At 425, DU 410 may determine to communicate with the RU 405 based on the RU 405 processing capability.

In some cases, at 430, the DU 410 may forward, to the RU 405, one or more processed downlink signals via the API, and the RU 405 may accept the one or more downlink signals. The one or more downlink signals may include one or more of a PDSCH transmission, PDCCH transmission, PBCH transmission, PSS, SSS, CSI-RS, etc.

At 435, the RU 405 may process one or more signals in accordance with the RU processing capability included in the message transmitted to the DU 410, the processing resulting in one or more processed signals. At least a first portion of the one or more processed signals may result from processing of uplink signals of the one or more signals. In some cases, the RU 405 may process the one or more downlink signals in accordance with the RU processing capability included in the message transmitted to the DU 410 based on a type of the one or more downlink signals (e.g., PDSCH, PDCCH, PBCH, PSS, SSS, CSI-RS), the RU processing capability, or both. The one or more processed signals includes at least a second portion that results from the processing of the one or more downlink signals. In some implementations, the RU 405 may perform, in accordance with the second processing capability, pre-filtering, digital beamforming, or both for each of the one or more uplink signals based on one or more processing coefficients. The one or more processing coefficients may include pre-filtering coefficients or digital beamforming coefficients. In some implementations, the RU 405 may perform, in accordance with the second processing capability, coherent combining across the one or more uplink signals.

In some cases, the RU 405 may receive one or more reference signals. As such, processing the one or more signals may be in accordance with the first processing capability and may be based on receiving the one or more reference signals. The one or more reference signals may be one or more DMRSs or one or more SRSs. In some cases, the RU 405 may receive one or more uplink shared channel transmissions, or one or more random access channel transmissions. As such, processing the one or more signals may be in accordance with the second processing capability and may be based on receiving the one or more uplink shared channel transmissions, or one or more random access channel transmissions, respectively.

In some implementations, the RU 405 may process the one or more downlink signals by encoding, precoding, applying transmit diversity, or a combination thereof to the one or more downlink signals based on the RU processing capability. In some implementations, the RU 405 may process the one or more downlink signals using sequence generation, precoding, applying transmit diversity, or a combination thereof to the one or more downlink signals based on the RU processing capability.

In some cases, at 440, the RU 405 may forward the first portion of the one or more processed signals as corresponding one or more processed uplink signals from the RU 405 to the DU 410 via an API that supports both the first processing capability and the second processing capability. In some cases, the RU 405 may send an indication of frequency domain I/Q samples associated with the one or more uplink signals, where the one or more uplink signals are received via one or more antennas and the indication includes a frequency domain I/Q sample per antenna of the one or more antennas. The API may support transmission (e.g., sending) of the indication in accordance with either the first processing capability or the second processing capability.

In some cases, the RU 405 may send an indication of frequency domain channel estimates associated with the one or more uplink signals, where the one or more uplink signals are received via one or more antennas and the indication includes a frequency domain channel estimate per antenna of the one or more antennas. The API may support transmission of the indication in accordance with the first processing capability. In some cases, the RU 405 may send an indication of a SNR ratio, a rank, timing advance information, or a combination thereof associated with each of the one or more processed uplink signals. The API may support transmission of the indication in accordance with the first processing capability.

In some cases, the RU 405 may send an indication of a list of UEs 115, a precoding matrix, a digital beamforming matrix, or a combination thereof associated with each of the one or more processed uplink signals. The API may support transmission of the indication in accordance with the first processing capability. In some cases, the RU 405 may send an indication of a RSRP, a SNR ratio, or a combination thereof associated with each of the one or more processed uplink signals. The API may support transmission of the indication in accordance with the first processing capability.

In some cases, the RU 405 may send an indication of a RSRP, a timing advance, an angle of arrival, or a combination thereof associated with a UE 115 (e.g., UE 115-*e*). The API may support transmission of the indication in accordance with the first processing capability. In some cases, the RU 405 may send an indication of pre-filtered frequency domain I/Q samples associated with the one or more processed uplink signals. The API may support transmission of the indication in accordance with the second processing capability. In some cases, the RU 405 may send an indication of demodulated LLRs associated with the one or more processed uplink signals, where each demodulated LLR may be associated with a physical layer. The API may support transmission of the indication in accordance with the second processing capability. The API may support one or more additional processing capabilities associated with at least one of MAC layer processing, RLC layer processing, or PDCP layer processing.

In some implementations, the RU 405 may determine, in accordance with either the first processing capability or the second processing capability, a channel estimation in a frequency domain, a SNR ratio, a RSRP, a timing advance, an angle of arrival, a rank, or a combination thereof based on the one or more uplink signals. Determining the channel estimation for each of the one or more uplink signals may be based on a codebook based precoding matrix, or a non-codebook based precoding matrix, in accordance with the first processing capability.

In some cases, at 445, the RU 405 may transmit the second portion of the one or more processed signals as one or more processed downlink signals from the RU to the DU 410.

Figure 5:
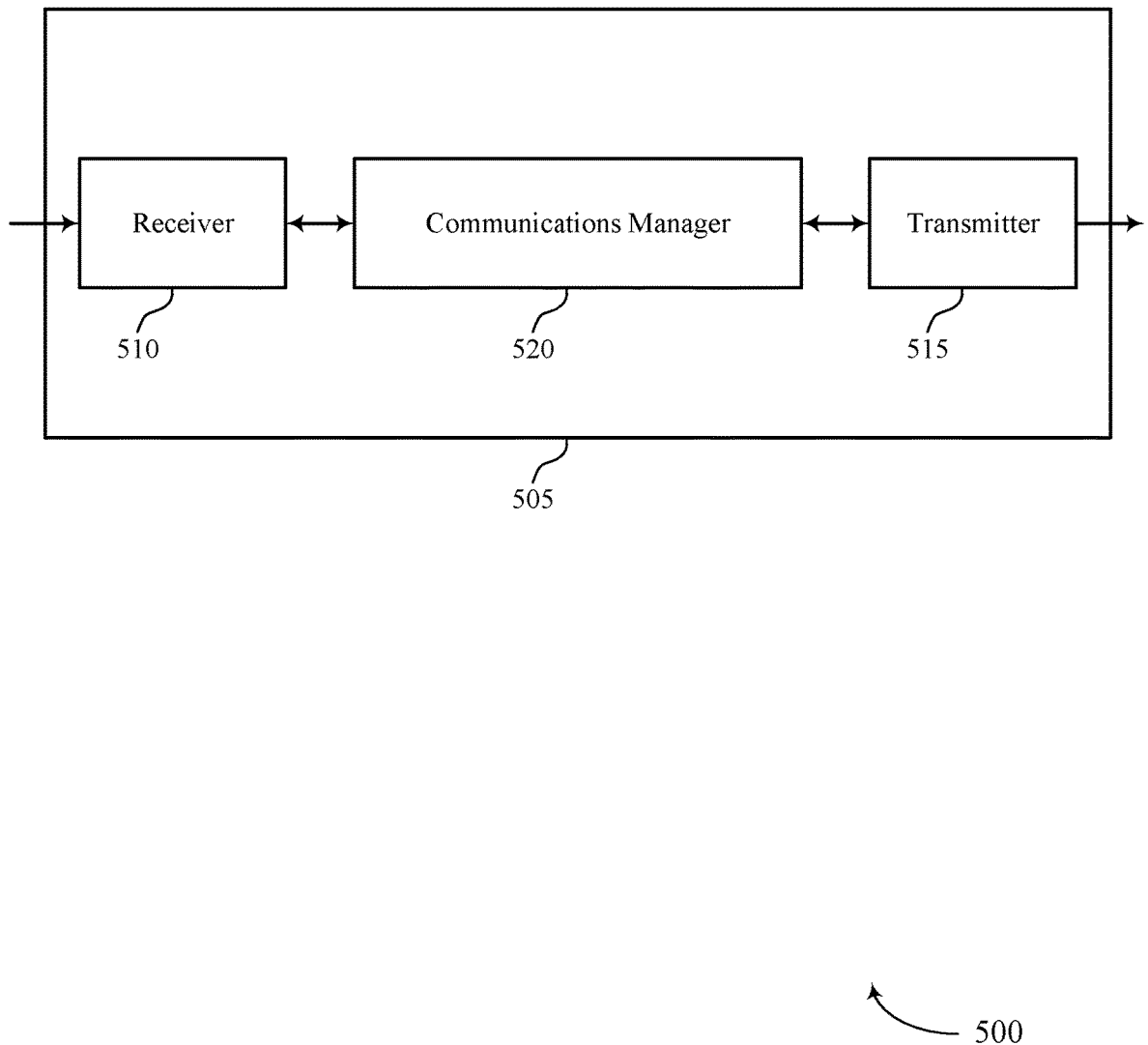
FIGS. 5 and 6 show block diagrams of devices that support communication techniques between an RU and a DU via an API in accordance with aspects of the present disclosure.

FIG. 5 shows a block diagram 500 of a device 505 that supports communication techniques between an RU and a DU via an API in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to communication techniques between an RU and a DU via an API). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to communication techniques between an RU and a DU via an API). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of communication techniques between an RU and a DU via an API as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), an field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a RU of a base station in accordance with examples as disclosed herein. For example, the communications manager 520 may be configured as or otherwise support a means for reporting, from the RU to a distributing unit of the base station, a message indicating that the RU supports a RU processing capability that is one of a first processing capability or a second processing capability, where the first processing capability corresponds to additional physical layer signal processing at the RU than does the second processing capability. The communications manager 520 may be configured as or otherwise support a means for processing one or more signals in accordance with the RU processing capability included in the message transmitted to the DU, the processing resulting in one or more processed signals, where at least a first portion of the one or more processed signals results from processing of uplink signals of the one or more signals. The communications manager 520 may be configured as or otherwise support a means for forwarding the first portion of the one or more processed signals as corresponding one or more processed uplink signals from the RU to the DU via an API that supports both the first processing capability and the second processing capability.

Additionally or alternatively, the communications manager 520 may support wireless communications at a DU of a base station in accordance with examples as disclosed herein. For example, the communications manager 520 may be configured as or otherwise support a means for accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The communications manager 520 may be configured as or otherwise support a means for determining to communicate with the RU based on the RU processing capability. The communications manager 520 may be configured as or otherwise support a means for accepting, at the DU, one or more processed uplink signals from the RU via an API that supports both the first processing capability and the second processing capability. The communications manager 520 may be configured as or otherwise support a means for forwarding, to the RU, one or more processed downlink signals via the API.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
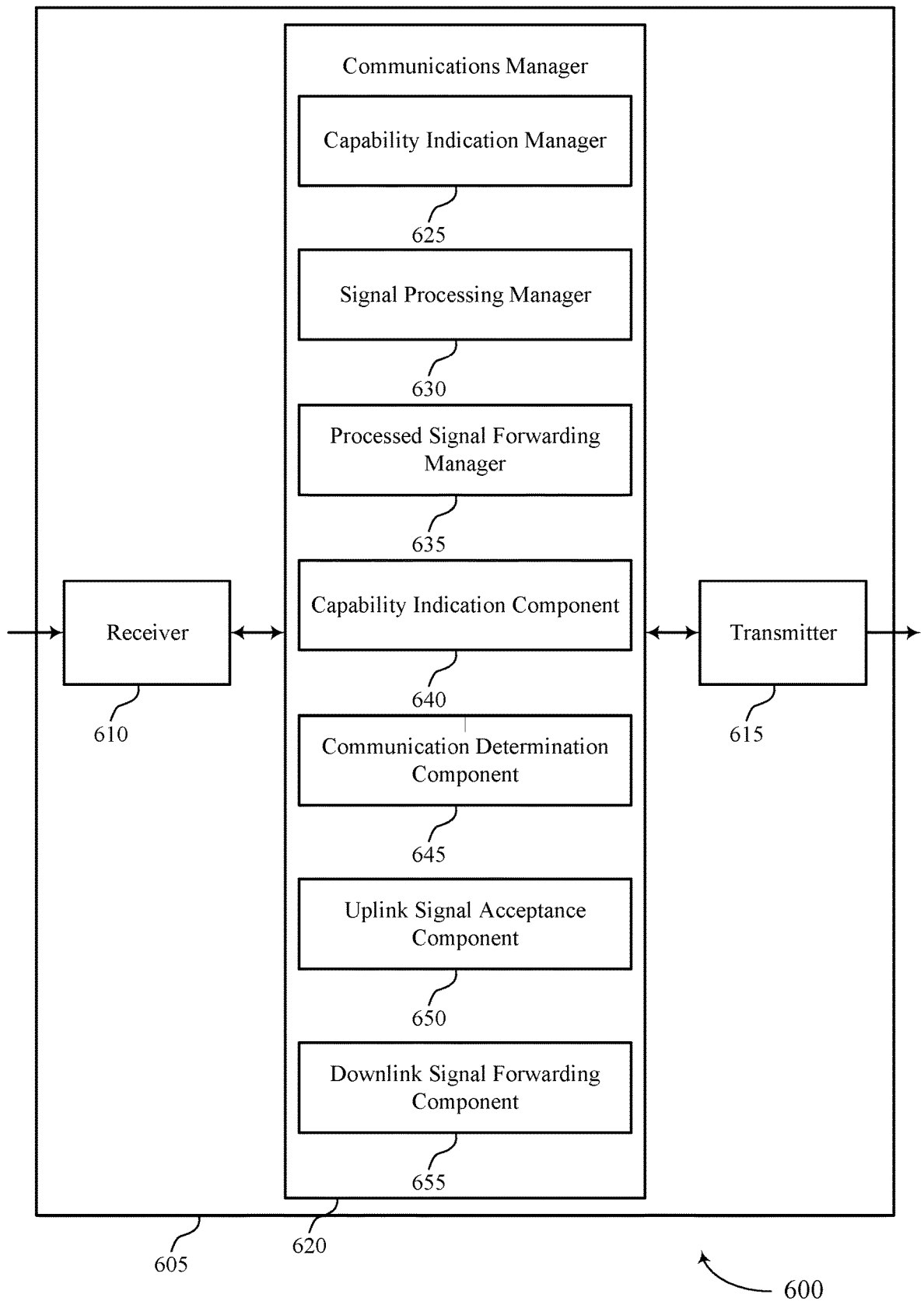

FIG. 6 shows a block diagram 600 of a device 605 that supports communication techniques between an RU and a DU via an API in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to communication techniques between an RU and a DU via an API). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to communication techniques between an RU and a DU via an API). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of communication techniques between an RU and a DU via an API as described herein. For example, the communications manager 620 may include a capability indication manager 625, a signal processing manager 630, a processed signal forwarding manager 635, a capability indication component 640, a communication determination component 645, an uplink signal acceptance component 650, a downlink signal forwarding component 655, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a RU of a base station in accordance with examples as disclosed herein. The capability indication manager 625 may be configured as or otherwise support a means for reporting, from the RU to a DU of the base station, a message indicating that the RU supports a RU processing capability that is one of a first processing capability or a second processing capability, where the first processing capability corresponds to additional physical layer signal processing at the RU than does the second processing capability. The signal processing manager 630 may be configured as or otherwise support a means for processing one or more signals in accordance with the RU processing capability included in the message transmitted to the DU, the processing resulting in one or more processed signals, where at least a first portion of the one or more processed signals results from processing of uplink signals of the one or more signals. The processed signal forwarding manager 635 may be configured as or otherwise support a means for forwarding the first portion of the one or more processed signals as corresponding one or more processed uplink signals from the RU to the DU via an API that supports both the first processing capability and the second processing capability.

Additionally or alternatively, the communications manager 620 may support wireless communications at a DU of a base station in accordance with examples as disclosed herein. The capability indication component 640 may be configured as or otherwise support a means for accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The communication determination component 645 may be configured as or otherwise support a means for determining to communicate with the RU based on the RU processing capability. The uplink signal acceptance component 650 may be configured as or otherwise support a means for accepting, at the DU, one or more processed uplink signals from the RU via an API that supports both the first processing capability and the second processing capability. The downlink signal forwarding component 655 may be configured as or otherwise support a means for forwarding, to the RU, one or more processed downlink signals via the API.

Figure 7:
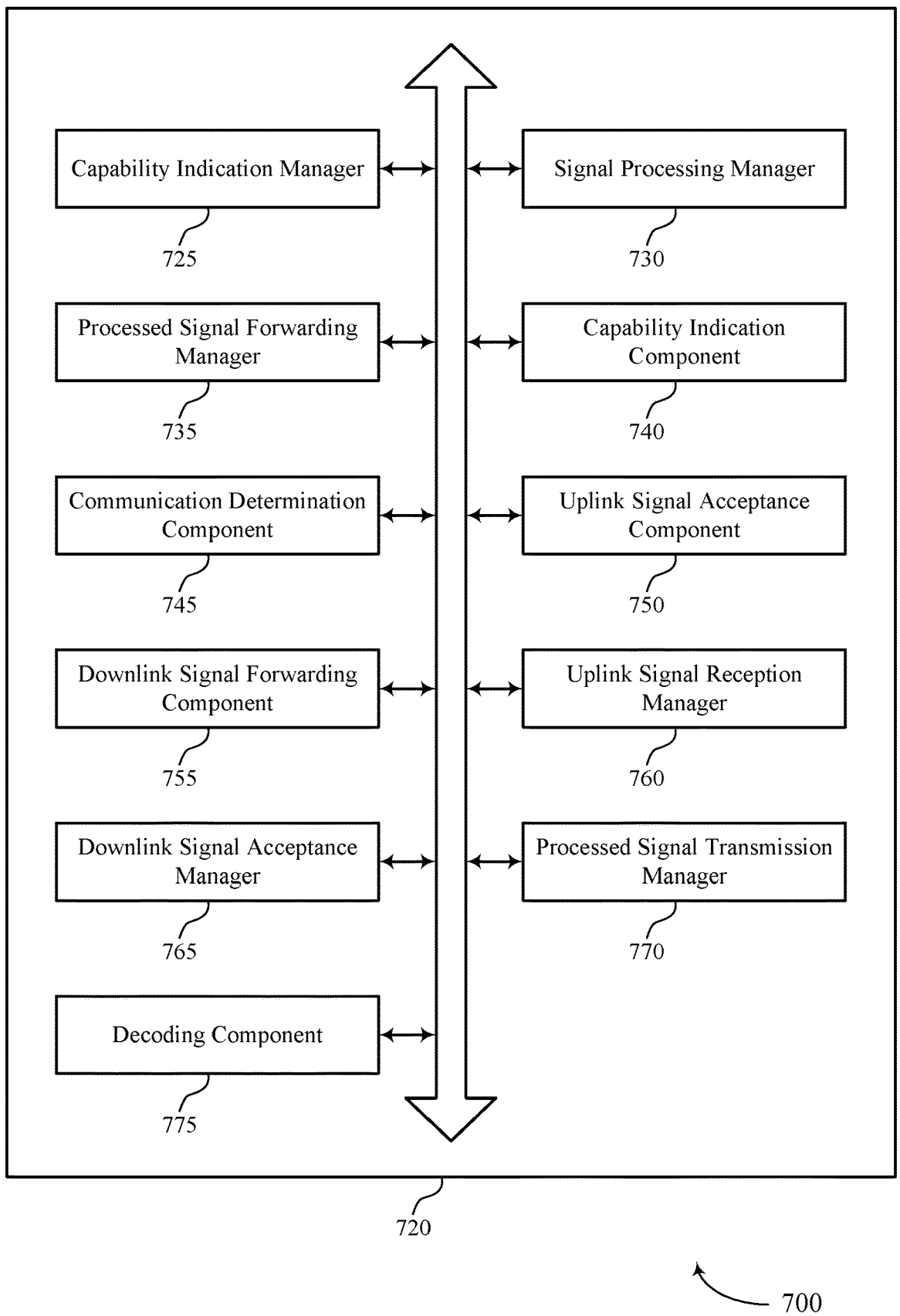
FIG. 7 shows a block diagram of a communications manager that supports communication techniques between an RU and a DU via an API in accordance with aspects of the present disclosure.

FIG. 7 shows a block diagram 700 of a communications manager 720 that supports communication techniques between an RU and a DU via an API in accordance with aspects of the present disclosure. The communications manager 720 may be an example of aspects of a communications manager 520, a communications manager 620, or both, as described herein. The communications manager 720, or various components thereof, may be an example of means for performing various aspects of communication techniques between an RU and a DU via an API as described herein. For example, the communications manager 720 may include a capability indication manager 725, a signal processing manager 730, a processed signal forwarding manager 735, a capability indication component 740, a communication determination component 745, an uplink signal acceptance component 750, a downlink signal forwarding component 755, an uplink signal reception manager 760, a downlink signal acceptance manager 765, a processed signal transmission manager 770, a decoding component 775, or any combination thereof. Each of these components may communicate, directly or indirectly, with one another (e.g., via one or more buses).

The communications manager 720 may support wireless communications at a RU of a base station in accordance with examples as disclosed herein. The capability indication manager 725 may be configured as or otherwise support a means for reporting, from the RU to a DU of the base station, a message indicating that the RU supports a RU processing capability that is one of a first processing capability or a second processing capability, where the first processing capability corresponds to additional physical layer signal processing at the RU than does the second processing capability. The signal processing manager 730 may be configured as or otherwise support a means for processing one or more signals in accordance with the RU processing capability included in the message transmitted to the DU, the processing resulting in one or more processed signals, where at least a first portion of the one or more processed signals results from processing of uplink signals of the one or more signals. The processed signal forwarding manager 735 may be configured as or otherwise support a means for forwarding the first portion of the one or more processed signals as corresponding one or more processed uplink signals from the RU to the DU via an API that supports both the first processing capability and the second processing capability.

In some examples, to support forwarding the one or more processed uplink signals, the signal processing manager 730 may be configured as or otherwise support a means for sending an indication of frequency domain momentary amplitude samples (I/Q samples) associated with the one or more uplink signals, where the one or more uplink signals are received via one or more antennas and the indication includes a frequency domain I/Q sample per antenna of the one or more antennas, and where the API supports transmission of the indication in accordance with either the first processing capability or the second processing capability.

In some examples, to support forwarding the one or more processed uplink signals, the signal processing manager 730 may be configured as or otherwise support a means for sending an indication of frequency domain channel estimates associated with the one or more uplink signals, where the one or more uplink signals are received via one or more antennas and the indication includes a frequency domain channel estimate per antenna of the one or more antennas, and where the API supports transmission of the indication in accordance with the first processing capability.

In some examples, to support forwarding the one or more processed uplink signals, the signal processing manager 730 may be configured as or otherwise support a means for sending an indication of a signal-to-noise ratio, a rank, timing advance information, or a combination thereof associated with each of the one or more processed uplink signals, where the API supports transmission of the indication in accordance with the first processing capability.

In some examples, to support forwarding the one or more processed uplink signals, the signal processing manager 730 may be configured as or otherwise support a means for sending an indication of a list of UEs, a precoding matrix, a digital beamforming matrix, or a combination thereof associated with each of the one or more processed uplink signals, where the API supports transmission of the indication in accordance with the first processing capability.

In some examples, to support forwarding the one or more processed uplink signals, the signal processing manager 730 may be configured as or otherwise support a means for sending an indication of a reference signal received power, a signal-to-noise ratio, or a combination thereof associated with each of the one or more processed uplink signals, where the API supports transmission of the indication in accordance with the first processing capability.

In some examples, to support forwarding the one or more processed uplink signals, the signal processing manager 730 may be configured as or otherwise support a means for sending an indication of a reference signal received power, a timing advance, an angle of arrival, or a combination thereof associated with a UE, where the API supports transmission of the indication in accordance with the first processing capability.

In some examples, to support forwarding the one or more processed uplink signals, the signal processing manager 730 may be configured as or otherwise support a means for sending an indication of pre-filtered frequency domain momentary amplitude samples (I/Q samples) associated with the one or more processed uplink signals, where the API supports transmission of the indication in accordance with the second processing capability.

In some examples, to support forwarding the one or more processed uplink signals, the signal processing manager 730 may be configured as or otherwise support a means for sending an indication of a demodulated log-likelihood ratios associated with the one or more processed uplink signals, where each demodulated log-likelihood ratio is associated with a physical layer, and where the API supports transmission of the indication in accordance with the second processing capability.

In some examples, to support processing the one or more signals, the signal processing manager 730 may be configured as or otherwise support a means for determining, in accordance with either the first processing capability or the second processing capability, a channel estimation in a frequency domain, a signal-to-noise ratio, a reference signal received power, a timing advance, an angle of arrival, a rank, or a combination thereof based on the one or more uplink signals.

In some examples, determining the channel estimation for each of the one or more uplink signals is based on a codebook based precoding matrix, or a non-codebook based precoding matrix, in accordance with the first processing capability.

In some examples, to support processing the one or more signals, the signal processing manager 730 may be configured as or otherwise support a means for performing, in accordance with the second processing capability, pre-filtering, digital beamforming, or both for each of the one or more uplink signals based on one or more processing coefficients, where the one or more processing coefficients include pre-filtering coefficients or digital beamforming coefficients.

In some examples, to support processing the one or more signals, the signal processing manager 730 may be configured as or otherwise support a means for performing, in accordance with the second processing capability, coherent combining across the one or more uplink signals.

In some examples, the uplink signal reception manager 760 may be configured as or otherwise support a means for receiving one or more reference signals, where processing the one or more signals is in accordance with the first processing capability and is based on receiving the one or more reference signals, the one or more reference signals being one or more DMRSs or one or more SRSs.

In some examples, the uplink signal reception manager 760 may be configured as or otherwise support a means for receiving one or more uplink shared channel transmissions, or one or more random access channel transmissions, where processing the one or more signals is in accordance with the second processing capability and is based on receiving the one or more uplink shared channel transmissions, or one or more random access channel transmissions, respectively.

In some examples, the downlink signal acceptance manager 765 may be configured as or otherwise support a means for accepting one or more downlink signals from the DU of the base station. In some examples, the signal processing manager 730 may be configured as or otherwise support a means for processing the one or more downlink signals in accordance with the RU processing capability included in the message transmitted to the DU based on a type of the one or more downlink signals, the RU processing capability, or both, where the one or more processed signals includes at least a second portion that results from the processing of the one or more downlink signals. In some examples, the processed signal transmission manager 770 may be configured as or otherwise support a means for transmitting the second portion of the one or more processed signals as one or more processed downlink signals from the RU to the DU.

In some examples, the one or more downlink signals include one or more of a downlink shared channel transmission, a downlink control channel transmission, a broadcast channel transmission and, to support processing the one or more downlink signals, the signal processing manager 730 may be configured as or otherwise support a means for processing the one or more downlink signals by encoding, precoding, applying transmit diversity, or a combination thereof to the one or more downlink signals based on the RU processing capability.

In some examples, the one or more downlink signals include one or more of a PSS, an SSS, a CSI-RS and, to support processing the one or more downlink signals, the signal processing manager 730 may be configured as or otherwise support a means for processing the one or more downlink signals using sequence generation, precoding, applying transmit diversity, or a combination thereof to the one or more downlink signals based on the RU processing capability.

In some examples, the first processing capability includes support for processing at a higher physical layer, a lower physical layer, and a radio frequency layer at the RU and the second processing capability includes support for processing at the lower physical layer, and the radio frequency layer at the RU.

In some examples, the API supports one or more additional processing capabilities associated with at least one of MAC layer processing, RLC layer processing, or PDCP layer processing.

Additionally or alternatively, the communications manager 720 may support wireless communications at a DU of a base station in accordance with examples as disclosed herein. The capability indication component 740 may be configured as or otherwise support a means for accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The communication determination component 745 may be configured as or otherwise support a means for determining to communicate with the RU based on the RU processing capability. The uplink signal acceptance component 750 may be configured as or otherwise support a means for accepting, at the DU, one or more processed uplink signals from the RU via an API that supports both the first processing capability and the second processing capability. The downlink signal forwarding component 755 may be configured as or otherwise support a means for forwarding, to the RU, one or more processed downlink signals via the API.

In some examples, to support accepting the one or more processed uplink signals, the uplink signal acceptance component 750 may be configured as or otherwise support a means for accepting an indication of frequency domain momentary amplitude samples (I/Q samples) or channel estimates associated with the one or more uplink signals, where the indication includes a frequency domain I/Q sample or channel estimate per antenna of the RU, and where the API supports reception of the indication in accordance with either the first processing capability or the second processing capability.

In some examples, to support accepting the one or more processed uplink signals, the uplink signal acceptance component 750 may be configured as or otherwise support a means for accepting an indication of a signal-to-noise ratio, a reference signal received power, a rank, timing advance information, a list of UEs, a precoding matrix, a digital beamforming matrix, or a combination thereof associated with each of the one or more processed uplink signals, where the API supports reception of the indication in accordance with the first processing capability.

In some examples, to support accepting the one or more processed uplink signals, the uplink signal acceptance component 750 may be configured as or otherwise support a means for accepting an indication of a reference signal received power, a timing advance, an angle of arrival, or a combination thereof associated with the UE, where the API supports reception of the indication in accordance with the first processing capability.

In some examples, to support accepting the one or more processed uplink signals, the uplink signal acceptance component 750 may be configured as or otherwise support a means for accepting an indication of pre-filtered frequency domain momentary amplitude samples (I/Q samples) associated with the one or more processed uplink signals, where the API supports reception of the indication in accordance with the second processing capability.

In some examples, to support accepting the one or more processed uplink signals, the uplink signal acceptance component 750 may be configured as or otherwise support a means for accepting an indication of a demodulated log-likelihood ratios associated with the one or more processed uplink signals, where each demodulated log-likelihood ratio is associated with a physical layer, and where the API supports reception of the indication in accordance with the second processing capability.

In some examples, the uplink signal acceptance component 750 may be configured as or otherwise support a means for processing the one or more processed uplink signals in accordance with the RU processing capability included in the message received from the RU, where the RU processing capability is the first processing capability.

In some examples, the decoding component 775 may be configured as or otherwise support a means for performing demodulation and decoding of the of the one or more processed uplink signals in accordance with the second processing capability.

In some examples, the one or more processed uplink signals are based on the RU processing capability, a fronthaul capacity, a signaling type associated with the one or more processed uplink signals, or a combination thereof.

In some examples, the signaling type is a DMRS, an SRS, an uplink shared channel transmission, a random access channel transmission, a downlink shared channel transmission, a downlink control channel transmission, a broadcast channel transmission, a PSS, an SSS, a CSI-RS, or a combination thereof.

Figure 8:
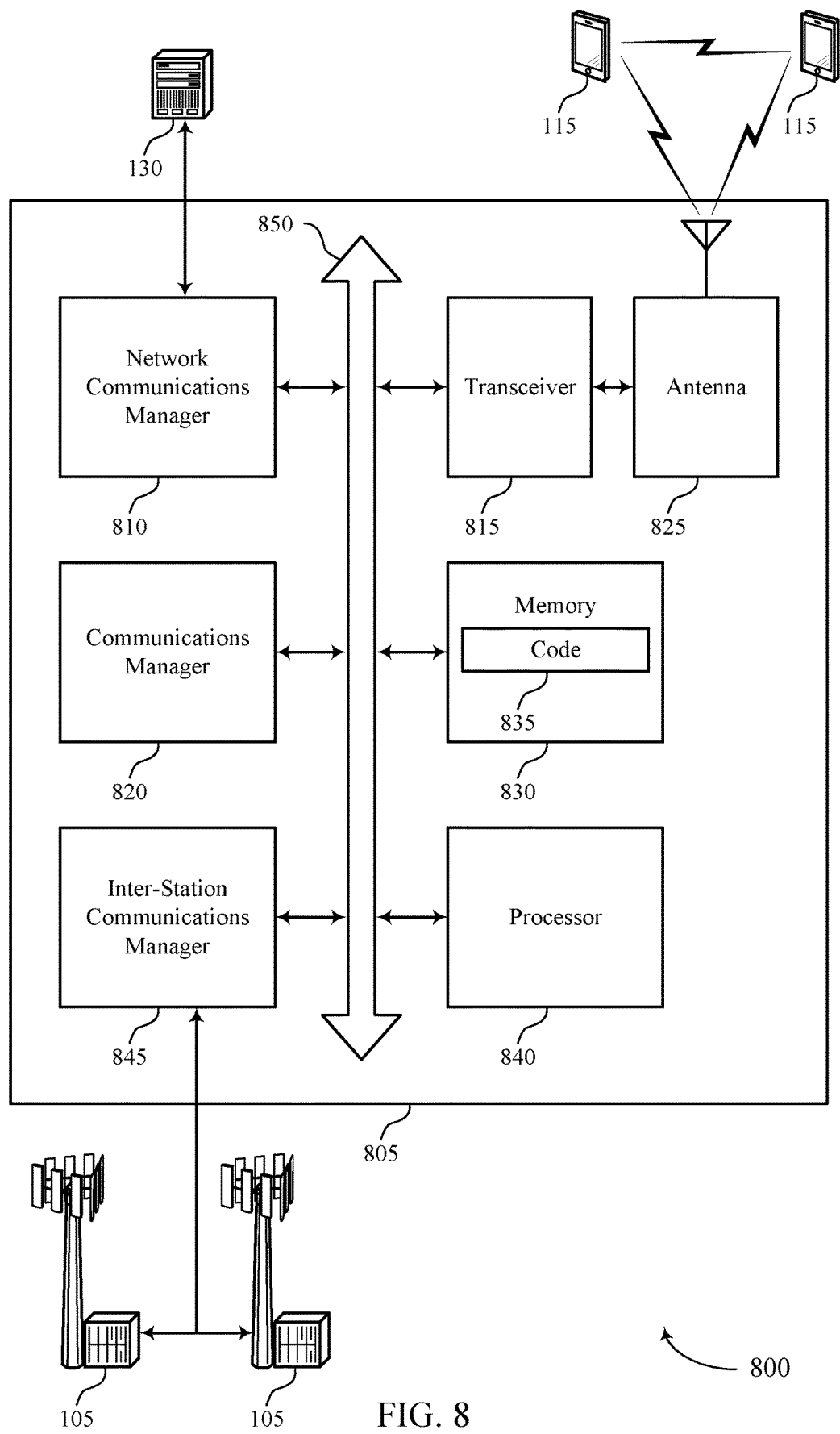
FIG. 8 shows a diagram of a system including a device that supports communication techniques between an RU and a DU via an API in accordance with aspects of the present disclosure.

FIG. 8 shows a diagram of a system 800 including a device 805 that supports communication techniques between an RU and a DU via an API in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting communication techniques between an RU and a DU via an API). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a RU of a base station in accordance with examples as disclosed herein. For example, the communications manager 820 may be configured as or otherwise support a means for reporting, from the RU to a distributing unit of the base station, a message indicating that the RU supports a RU processing capability that is one of a first processing capability or a second processing capability, where the first processing capability corresponds to additional physical layer signal processing at the RU than does the second processing capability. The communications manager 820 may be configured as or otherwise support a means for processing one or more signals in accordance with the RU processing capability included in the message transmitted to the DU, the processing resulting in one or more processed signals, where at least a first portion of the one or more processed signals results from processing of uplink signals of the one or more signals. The communications manager 820 may be configured as or otherwise support a means for forwarding the first portion of the one or more processed signals as corresponding one or more processed uplink signals from the RU to the DU via an API that supports both the first processing capability and the second processing capability.

Additionally or alternatively, the communications manager 820 may support wireless communications at a DU of a base station in accordance with examples as disclosed herein. For example, the communications manager 820 may be configured as or otherwise support a means for accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The communications manager 820 may be configured as or otherwise support a means for determining to communicate with the RU based on the RU processing capability. The communications manager 820 may be configured as or otherwise support a means for accepting, at the DU, one or more processed uplink signals from the RU via an API that supports both the first processing capability and the second processing capability. The communications manager 820 may be configured as or otherwise support a means for forwarding, to the RU, one or more processed downlink signals via the API.

By including or configuring the communications manager 820 in accordance with examples as described herein, the device 805 may support techniques for more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of communication techniques between an RU and a DU via an API as described herein, or the processor 840 and the memory 830 may be otherwise configured to perform or support such operations.

Figure 9:
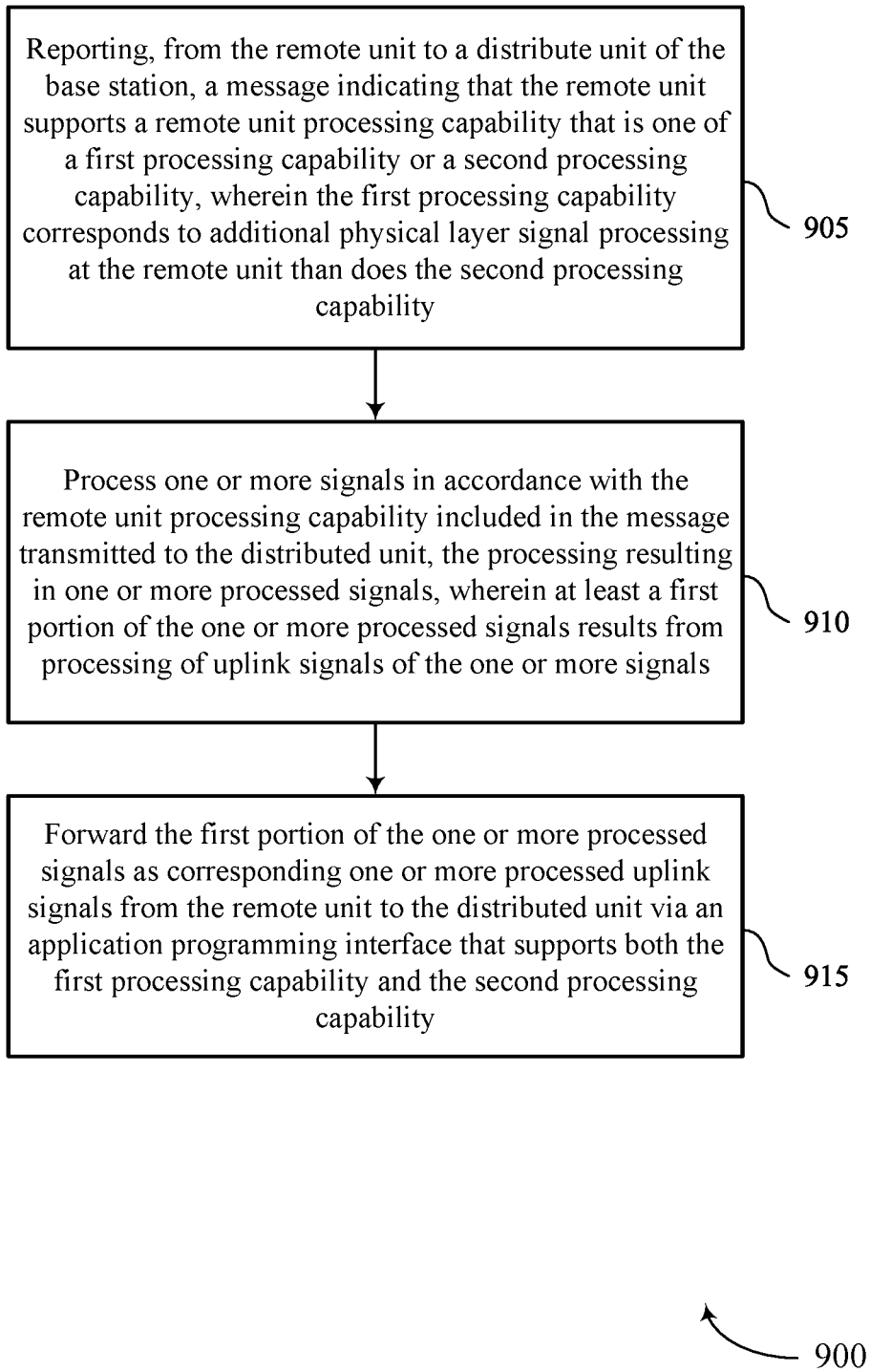
FIGS. 9 through 12 show flowcharts illustrating methods that support communication techniques between an RU and a DU via an API in accordance with aspects of the present disclosure.

FIG. 9 shows a flowchart illustrating a method 900 that supports communication techniques between an RU and a DU via an API in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include reporting, from the RU to a DU of the base station, a message indicating that the RU supports a RU processing capability that is one of a first processing capability or a second processing capability, where the first processing capability corresponds to additional physical layer signal processing at the RU than does the second processing capability. The operations of 905 may be performed in accordance with examples as disclosed herein. In some examples, aspects of the operations of 905 may be performed by a capability indication manager 725 as described with reference to FIG. 7.

At 910, the method may include processing one or more signals in accordance with the RU processing capability included in the message transmitted to the DU, the processing resulting in one or more processed signals, where at least a first portion of the one or more processed signals results from processing of uplink signals of the one or more signals. The operations of 910 may be performed in accordance with examples as disclosed herein. In some examples, aspects of the operations of 910 may be performed by a signal processing manager 730 as described with reference to FIG. 7.

At 915, the method may include forwarding the first portion of the one or more processed signals as corresponding one or more processed uplink signals from the RU to the DU via an API that supports both the first processing capability and the second processing capability. The operations of 915 may be performed in accordance with examples as disclosed herein. In some examples, aspects of the operations of 915 may be performed by a processed signal forwarding manager 735 as described with reference to FIG. 7.

Figure 10:
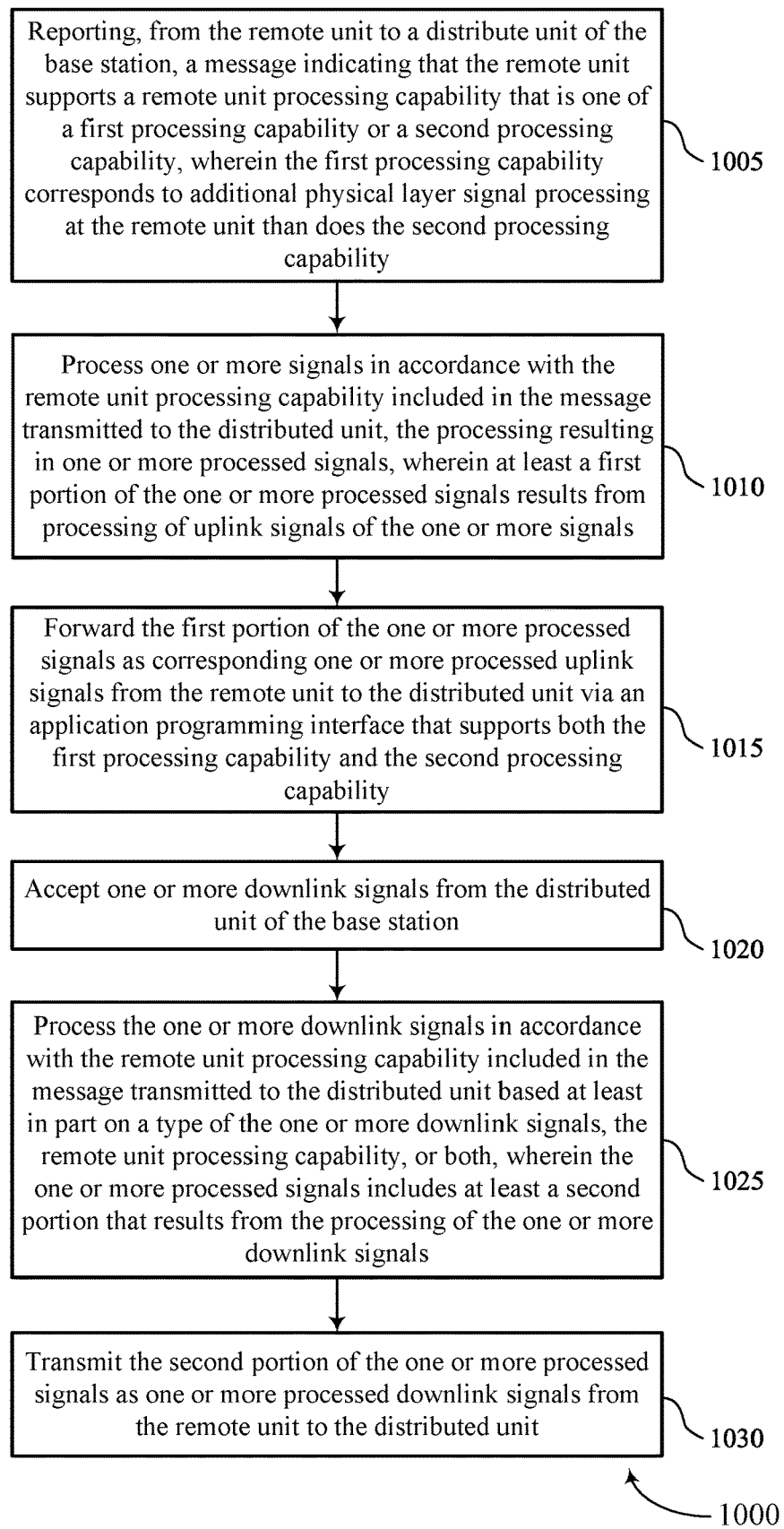

FIG. 10 shows a flowchart illustrating a method 1000 that supports communication techniques between an RU and a DU via an API in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include reporting, from the RU to a DU of the base station, a message indicating that the RU supports a RU processing capability that is one of a first processing capability or a second processing capability, where the first processing capability corresponds to additional physical layer signal processing at the RU than does the second processing capability. The operations of 1005 may be performed in accordance with examples as disclosed herein. In some examples, aspects of the operations of 1005 may be performed by a capability indication manager 725 as described with reference to FIG. 7.

At 1010, the method may include processing one or more signals in accordance with the RU processing capability included in the message transmitted to the DU, the processing resulting in one or more processed signals, where at least a first portion of the one or more processed signals results from processing of uplink signals of the one or more signals. The operations of 1010 may be performed in accordance with examples as disclosed herein. In some examples, aspects of the operations of 1010 may be performed by a signal processing manager 730 as described with reference to FIG. 7.

At 1015, the method may include forwarding the first portion of the one or more processed signals as corresponding one or more processed uplink signals from the RU to the DU via an API that supports both the first processing capability and the second processing capability. The operations of 1015 may be performed in accordance with examples as disclosed herein. In some examples, aspects of the operations of 1015 may be performed by a processed signal forwarding manager 735 as described with reference to FIG. 7.

At 1020, the method may include accepting one or more downlink signals from the DU of the base station. The operations of 1020 may be performed in accordance with examples as disclosed herein. In some examples, aspects of the operations of 1020 may be performed by a downlink signal acceptance manager 765 as described with reference to FIG. 7.

At 1025, the method may include processing the one or more downlink signals in accordance with the RU processing capability included in the message transmitted to the DU based on a type of the one or more downlink signals, the RU processing capability, or both, where the one or more processed signals includes at least a second portion that results from the processing of the one or more downlink signals. The operations of 1025 may be performed in accordance with examples as disclosed herein. In some examples, aspects of the operations of 1025 may be performed by a signal processing manager 730 as described with reference to FIG. 7.

At 1030, the method may include transmitting the second portion of the one or more processed signals as one or more processed downlink signals from the RU to the DU. The operations of 1030 may be performed in accordance with examples as disclosed herein. In some examples, aspects of the operations of 1030 may be performed by a processed signal transmission manager 770 as described with reference to FIG. 7.

Figure 11:
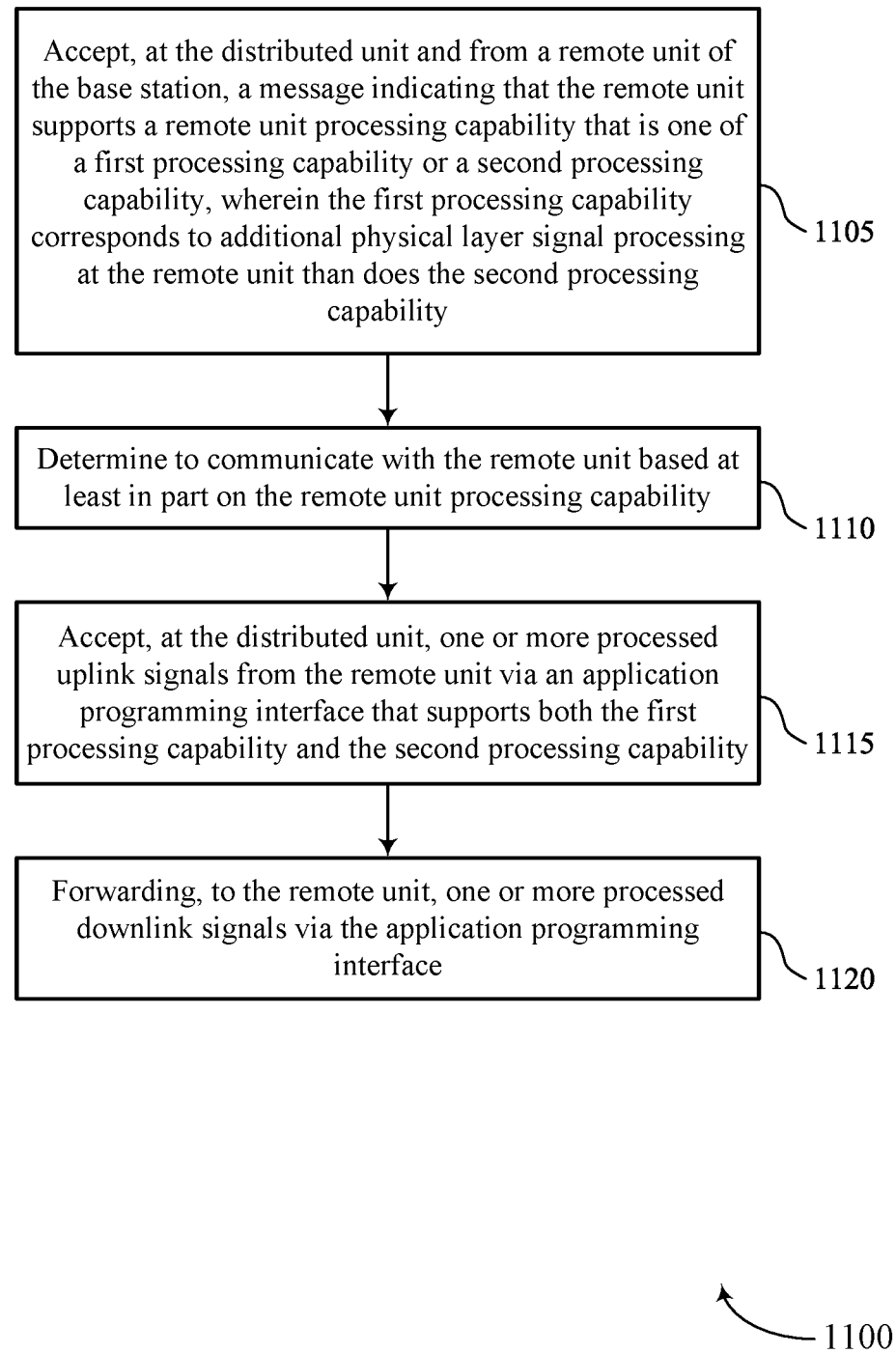

FIG. 11 shows a flowchart illustrating a method 1100 that supports communication techniques between an RU and a DU via an API in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The operations of 1105 may be performed in accordance with examples as disclosed herein. In some examples, aspects of the operations of 1105 may be performed by a capability indication component 740 as described with reference to FIG. 7.

At 1110, the method may include determining to communicate with the RU based on the RU processing capability. The operations of 1110 may be performed in accordance with examples as disclosed herein. In some examples, aspects of the operations of 1110 may be performed by a communication determination component 745 as described with reference to FIG. 7.

At 1115, the method may include accepting, at the DU, one or more processed uplink signals from the RU via an API that supports both the first processing capability and the second processing capability. The operations of 1115 may be performed in accordance with examples as disclosed herein. In some examples, aspects of the operations of 1115 may be performed by an uplink signal acceptance component 750 as described with reference to FIG. 7.

At 1120, the method may include forwarding, to the RU, one or more processed downlink signals via the API. The operations of 1120 may be performed in accordance with examples as disclosed herein. In some examples, aspects of the operations of 1120 may be performed by a downlink signal forwarding component 755 as described with reference to FIG. 7.

Figure 12:
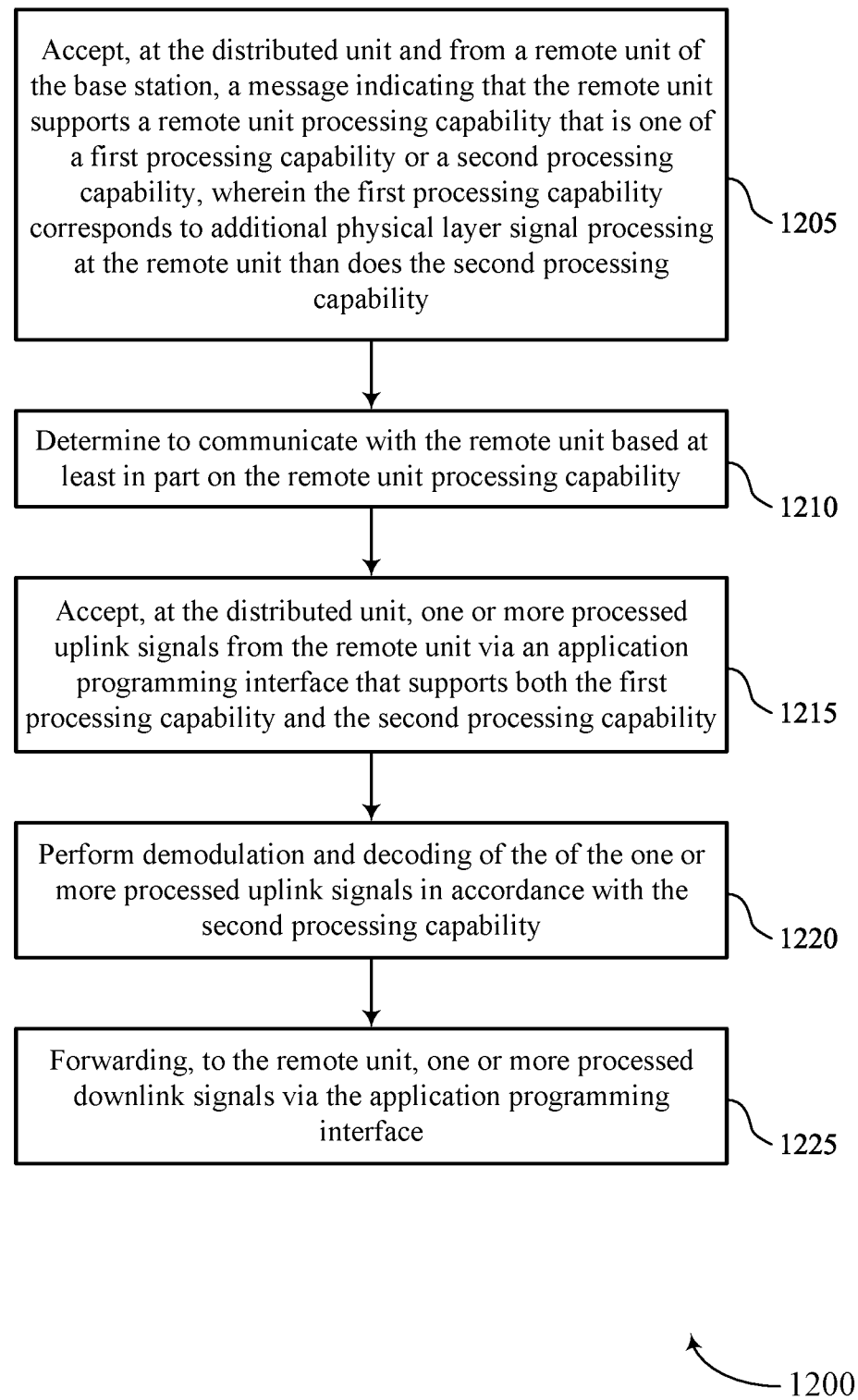

FIG. 12 shows a flowchart illustrating a method 1200 that supports communication techniques between an RU and a DU via an API in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include accepting, at the DU and from a RU of the base station, a message indicating that the RU supports a RU processing capability that is one of a first processing capability or a second processing capability, where the first processing capability corresponds to additional physical layer signal processing at the RU than does the second processing capability. The operations of 1205 may be performed in accordance with examples as disclosed herein. In some examples, aspects of the operations of 1205 may be performed by a capability indication component 740 as described with reference to FIG. 7.

At 1210, the method may include determining to communicate with the RU based on the RU processing capability. The operations of 1210 may be performed in accordance with examples as disclosed herein. In some examples, aspects of the operations of 1210 may be performed by a communication determination component 745 as described with reference to FIG. 7.

At 1215, the method may include accepting, at the DU, one or more processed uplink signals from the RU via an API that supports both the first processing capability and the second processing capability. The operations of 1215 may be performed in accordance with examples as disclosed herein. In some examples, aspects of the operations of 1215 may be performed by an uplink signal acceptance component 750 as described with reference to FIG. 7.

At 1220, the method may include performing demodulation and decoding of the of the one or more processed uplink signals in accordance with the second processing capability. The operations of 1220 may be performed in accordance with examples as disclosed herein. In some examples, aspects of the operations of 1220 may be performed by a decoding component 775 as described with reference to FIG. 7.

At 1225, the method may include forwarding, to the RU, one or more processed downlink signals via the API. The operations of 1225 may be performed in accordance with examples as disclosed herein. In some examples, aspects of the operations of 1225 may be performed by a downlink signal forwarding component 755 as described with reference to FIG. 7.

The following provides an overview of aspects of the present disclosure:

Aspect 1: A method for wireless communications at a remote unit of a base station, comprising: reporting, from the remote unit to a distributed unit of the base station, a message indicating that the remote unit supports a remote unit processing capability that is one of a first processing capability or a second processing capability, wherein the first processing capability corresponds to additional physical layer signal processing at the remote unit than does the second processing capability; processing one or more signals in accordance with the remote unit processing capability included in the message transmitted to the distributed unit, the processing resulting in one or more processed signals, wherein at least a first portion of the one or more processed signals results from processing of uplink signals of the one or more signals; and forwarding the first portion of the one or more processed signals as corresponding one or more processed uplink signals from the remote unit to the distributed unit via an application programming interface that supports both the first processing capability and the second processing capability.

Aspect 2: The method of aspect 1, wherein forwarding the one or more processed uplink signals further comprises: sending an indication of frequency domain momentary amplitude samples (I/Q samples) associated with the one or more uplink signals, wherein the one or more uplink signals are received via one or more antennas and the indication comprises a frequency domain I/Q sample per antenna of the one or more antennas, and wherein the application programming interface supports transmission of the indication in accordance with either the first processing capability or the second processing capability.

Aspect 3: The method of any of aspects 1 through 2, wherein forwarding the one or more processed uplink signals further comprises: sending an indication of frequency domain channel estimates associated with the one or more uplink signals, wherein the one or more uplink signals are received via one or more antennas and the indication comprises a frequency domain channel estimate per antenna of the one or more antennas, and wherein the application programming interface supports transmission of the indication in accordance with the first processing capability.

Aspect 4: The method of any of aspects 1 through 3, wherein forwarding the one or more processed uplink signals further comprises: sending an indication of a signal-to-noise ratio, a rank, timing advance information, or a combination thereof associated with each of the one or more processed uplink signals, wherein the application programming interface supports transmission of the indication in accordance with the first processing capability.

Aspect 5: The method of any of aspects 1 through 4, wherein forwarding the one or more processed uplink signals further comprises: sending an indication of a list of UEs, a precoding matrix, a digital beamforming matrix, or a combination thereof associated with each of the one or more processed uplink signals, wherein the application programming interface supports transmission of the indication in accordance with the first processing capability.

Aspect 6: The method of any of aspects 1 through 5, wherein forwarding the one or more processed uplink signals further comprises: sending an indication of a reference signal received power, a signal-to-noise ratio, or a combination thereof associated with each of the one or more processed uplink signals, wherein the application programming interface supports transmission of the indication in accordance with the first processing capability.

Aspect 7: The method of any of aspects 1 through 6, wherein forwarding the one or more processed uplink signals further comprises: sending an indication of a reference signal received power, a timing advance, an angle of arrival, or a combination thereof associated with a UE, wherein the application programming interface supports transmission of the indication in accordance with the first processing capability.

Aspect 8: The method of any of aspects 1 through 7, wherein forwarding the one or more processed uplink signals further comprises: sending an indication of pre-filtered frequency domain momentary amplitude samples (I/Q samples) associated with the one or more processed uplink signals, wherein the application programming interface supports transmission of the indication in accordance with the second processing capability.

Aspect 9: The method of any of aspects 1 through 8, wherein forwarding the one or more processed uplink signals further comprises: sending an indication of a demodulated log-likelihood ratios associated with the one or more processed uplink signals, wherein each demodulated log-likelihood ratio is associated with a physical layer, and wherein the application programming interface supports transmission of the indication in accordance with the second processing capability.

Aspect 10: The method of any of aspects 1 through 9, wherein processing the one or more signals further comprises: determining, in accordance with either the first processing capability or the second processing capability, a channel estimation in a frequency domain, a signal-to-noise ratio, a reference signal received power, a timing advance, an angle of arrival, a rank, or a combination thereof based at least in part on the one or more uplink signals.

Aspect 11: The method of aspect 10, wherein determining the channel estimation for each of the one or more uplink signals is based on a codebook based precoding matrix, or a non-codebook based precoding matrix, in accordance with the first processing capability.

Aspect 12: The method of any of aspects 1 through 11, wherein processing the one or more signals further comprises: performing, in accordance with the second processing capability, pre-filtering, digital beamforming, or both for each of the one or more uplink signals based at least in part on one or more processing coefficients, wherein the one or more processing coefficients comprise pre-filtering coefficients or digital beamforming coefficients.

Aspect 13: The method of any of aspects 1 through 12, wherein processing the one or more signals further comprises: performing, in accordance with the second processing capability, coherent combining across the one or more uplink signals.

Aspect 14: The method of any of aspects 1 through 13, further comprising: receiving one or more reference signals, wherein processing the one or more signals is in accordance with the first processing capability and is based at least in part on receiving the one or more reference signals, the one or more reference signals being one or more demodulation reference signals or one or more sounding reference signals.

Aspect 15: The method of any of aspects 1 through 14, further comprising: receiving one or more uplink shared channel transmissions, or one or more random access channel transmissions, wherein processing the one or more signals is in accordance with the second processing capability and is based at least in part on receiving the one or more uplink shared channel transmissions, or one or more random access channel transmissions, respectively.

Aspect 16: The method of any of aspects 1 through 15, further comprising: accepting one or more downlink signals from the distributed unit of the base station; and processing the one or more downlink signals in accordance with the remote unit processing capability included in the message transmitted to the distributed unit based at least in part on a type of the one or more downlink signals, the remote unit processing capability, or both, wherein the one or more processed signals includes at least a second portion that results from the processing of the one or more downlink signals; and transmitting the second portion of the one or more processed signals as one or more processed downlink signals from the remote unit to the distributed unit.

Aspect 17: The method of aspect 16, wherein the one or more downlink signals comprise one or more of a downlink shared channel transmission, a downlink control channel transmission, a broadcast channel transmission and processing the one or more downlink signals further comprises: processing the one or more downlink signals by encoding, precoding, applying transmit diversity, or a combination thereof to the one or more downlink signals based at least in part on the remote unit processing capability.

Aspect 18: The method of any of aspects 16 through 17, wherein the one or more downlink signals comprise one or more of a primary synchronization signal, a secondary synchronization signal, a channel state information reference signal and processing the one or more downlink signals further comprises: processing the one or more downlink signals using sequence generation, precoding, applying transmit diversity, or a combination thereof to the one or more downlink signals based at least in part on the remote unit processing capability.

Aspect 19: The method of any of aspects 1 through 18, wherein the first processing capability comprises support for processing at a higher physical layer, a lower physical layer, and a radio frequency layer at the remote unit and the second processing capability comprises support for processing at the lower physical layer, and the radio frequency layer at the remote unit.

Aspect 20: The method of any of aspects 1 through 19, wherein the application programming interface supports one or more additional processing capabilities associated with at least one of medium access control (MAC) layer processing, remote link control (RLC) layer processing, or packet data convergence protocol (PDCP) layer processing.

Aspect 21: A method for wireless communications at a distributed unit of a base station, comprising: accepting, at the distributed unit and from a remote unit of the base station, a message indicating that the remote unit supports a remote unit processing capability that is one of a first processing capability or a second processing capability, wherein the first processing capability corresponds to additional physical layer signal processing at the remote unit than does the second processing capability; determining to communicate with the remote unit based at least in part on the remote unit processing capability; accepting, at the distributed unit, one or more processed uplink signals from the remote unit via an application programming interface that supports both the first processing capability and the second processing capability; and forwarding, to the remote unit, one or more processed downlink signals via the application programming interface.

Aspect 22: The method of aspect 21, wherein accepting the one or more processed uplink signals further comprises: accepting an indication of frequency domain momentary amplitude samples (I/Q samples) or channel estimates associated with the one or more uplink signals, wherein the indication comprises a frequency domain I/Q sample or channel estimate per antenna of the remote unit, and wherein the application programming interface supports reception of the indication in accordance with either the first processing capability or the second processing capability.

Aspect 23: The method of any of aspects 21 through 22, wherein accepting the one or more processed uplink signals further comprises: accepting an indication of a signal-to-noise ratio, a reference signal received power, a rank, timing advance information, a list of UEs, a precoding matrix, a digital beamforming matrix, or a combination thereof associated with each of the one or more processed uplink signals, wherein the application programming interface supports reception of the indication in accordance with the first processing capability.

Aspect 24: The method of any of aspects 21 through 23, wherein accepting the one or more processed uplink signals further comprises: accepting an indication of a reference signal received power, a timing advance, an angle of arrival, or a combination thereof associated with the UE, wherein the application programming interface supports reception of the indication in accordance with the first processing capability.

Aspect 25: The method of any of aspects 21 through 24, wherein accepting the one or more processed uplink signals further comprises: accepting an indication of pre-filtered frequency domain momentary amplitude samples (I/Q samples) associated with the one or more processed uplink signals, wherein the application programming interface supports reception of the indication in accordance with the second processing capability.

Aspect 26: The method of any of aspects 21 through 25, wherein accepting the one or more processed uplink signals further comprises: accepting an indication of a demodulated log-likelihood ratios associated with the one or more processed uplink signals, wherein each demodulated log-likelihood ratio is associated with a physical layer, and wherein the application programming interface supports reception of the indication in accordance with the second processing capability.

Aspect 27: The method of any of aspects 21 through 26, further comprising: processing the one or more processed uplink signals in accordance with the remote unit processing capability included in the message received from the remote unit, wherein the remote unit processing capability is the first processing capability.

Aspect 28: The method of any of aspects 21 through 27, further comprising: performing demodulation and decoding of the of the one or more processed uplink signals in accordance with the second processing capability.

Aspect 29: The method of any of aspects 21 through 28, wherein the one or more processed uplink signals are based at least in part on the remote unit processing capability, a fronthaul capacity, a signaling type associated with the one or more processed uplink signals, or a combination thereof.

Aspect 30: The method of aspect 29, wherein the signaling type is a demodulation reference signal, a sounding reference signal, an uplink shared channel transmission, a random access channel transmission, a downlink shared channel transmission, a downlink control channel transmission, a broadcast channel transmission, a primary synchronization signal, a secondary synchronization signal, a channel state information reference signal, or a combination thereof.

Aspect 31: An apparatus for wireless communications, comprising a processor; memory coupled with the processor; and instructions stored in the memory and executable by the processor to cause the apparatus to perform a method of any of aspects 1 through 20.

Aspect 32: An apparatus for wireless communications, comprising at least one means for performing a method of any of aspects 1 through 20.

Aspect 33: A non-transitory computer-readable medium storing code for wireless communications, the code comprising instructions executable by a processor to perform a method of any of aspects 1 through 20.

Aspect 34: An apparatus for wireless, comprising a processor; memory coupled with the processor; and instructions stored in the memory and executable by the processor to cause the apparatus to perform a method of any of aspects 21 through 30.

Aspect 35: An apparatus for wireless communications, comprising at least one means for performing a method of any of aspects 21 through 30.

Aspect 36: A non-transitory computer-readable medium storing code for wireless communications, the code comprising instructions executable by a processor to perform a method of any of aspects 21 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a remote unit of a base station, comprising:
    reporting, from the remote unit to a distributed unit of the base station, a message indicating that the remote unit supports a remote unit processing capability that is one of a first processing capability or a second processing capability, wherein the first processing capability corresponds to additional physical layer signal processing at the remote unit than does the second processing capability;
    processing one or more signals in accordance with the remote unit processing capability included in the message transmitted to the distributed unit, the processing resulting in one or more processed signals, wherein at least a first portion of the one or more processed signals results from processing of uplink signals of the one or more signals; and
    forwarding the first portion of the one or more processed signals as corresponding one or more processed uplink signals from the remote unit to the distributed unit via an application programming interface that supports both the first processing capability and the second processing capability.

2. The method of claim 1, wherein forwarding the one or more processed uplink signals further comprises:
    sending an indication of frequency domain momentary amplitude samples (I/Q samples) associated with the one or more uplink signals, wherein the one or more uplink signals are received via one or more antennas and the indication comprises a frequency domain I/Q sample per antenna of the one or more antennas, and wherein the application programming interface supports transmission of the indication in accordance with either the first processing capability or the second processing capability.

3. The method of claim 1, wherein forwarding the one or more processed uplink signals further comprises:
    sending an indication of frequency domain channel estimates associated with the one or more uplink signals, wherein the one or more uplink signals are received via one or more antennas and the indication comprises a frequency domain channel estimate per antenna of the one or more antennas, and wherein the application programming interface supports transmission of the indication in accordance with the first processing capability.

4. The method of claim 1, wherein forwarding the one or more processed uplink signals further comprises:
    sending an indication of a signal-to-noise ratio, a rank, timing advance information, or a combination thereof associated with each of the one or more processed uplink signals, wherein the application programming interface supports transmission of the indication in accordance with the first processing capability.

5. The method of claim 1, wherein forwarding the one or more processed uplink signals further comprises:
    sending an indication of a list of UEs, a precoding matrix, a digital beamforming matrix, or a combination thereof associated with each of the one or more processed uplink signals, wherein the application programming interface supports transmission of the indication in accordance with the first processing capability.

6. The method of claim 1, wherein forwarding the one or more processed uplink signals further comprises:
    sending an indication of a reference signal received power, a signal-to-noise ratio, or a combination thereof associated with each of the one or more processed uplink signals, wherein the application programming interface supports transmission of the indication in accordance with the first processing capability.

7. The method of claim 1, wherein forwarding the one or more processed uplink signals further comprises:
sending an indication of a reference signal received power, a timing advance, an angle of arrival, or a combination thereof associated with a user equipment (UE), wherein the application programming interface supports transmission of the indication in accordance with the first processing capability.

8. The method of claim 1, wherein forwarding the one or more processed uplink signals further comprises:
sending an indication of pre-filtered frequency domain momentary amplitude samples (I/Q samples) associated with the one or more processed uplink signals, wherein the application programming interface supports transmission of the indication in accordance with the second processing capability.

9. The method of claim 1, wherein forwarding the one or more processed uplink signals further comprises:
sending an indication of a demodulated log-likelihood ratios associated with the one or more processed uplink signals, wherein each demodulated log-likelihood ratio is associated with a physical layer, and wherein the application programming interface supports transmission of the indication in accordance with the second processing capability.

10. The method of claim 1, wherein processing the one or more signals further comprises:
determining, in accordance with either the first processing capability or the second processing capability, a channel estimation in a frequency domain, a signal-to-noise ratio, a reference signal received power, a timing advance, an angle of arrival, a rank, or a combination thereof based at least in part on the one or more uplink signals.

11. The method of claim 10, wherein determining the channel estimation for each of the one or more uplink signals is based on a codebook based precoding matrix, or a non-codebook based precoding matrix, in accordance with the first processing capability.

12. The method of claim 1, wherein processing the one or more signals further comprises:
performing, in accordance with the second processing capability, pre-filtering, digital beamforming, or both for each of the one or more uplink signals based at least in part on one or more processing coefficients, wherein the one or more processing coefficients comprise pre-filtering coefficients or digital beamforming coefficients.

13. The method of claim 1, wherein processing the one or more signals further comprises:
performing, in accordance with the second processing capability, coherent combining across the one or more uplink signals.

14. The method of claim 1, further comprising:
receiving one or more reference signals, wherein processing the one or more signals is in accordance with the first processing capability and is based at least in part on receiving the one or more reference signals, the one or more reference signals being one or more demodulation reference signals or one or more sounding reference signals.

15. The method of claim 1, further comprising:
receiving one or more uplink shared channel transmissions, or one or more random access channel transmissions, wherein processing the one or more signals is in accordance with the second processing capability and is based at least in part on receiving the one or more uplink shared channel transmissions, or one or more random access channel transmissions, respectively.

16. The method of claim 1, further comprising:
accepting one or more downlink signals from the distributed unit of the base station; and
processing the one or more downlink signals in accordance with the remote unit processing capability included in the message transmitted to the distributed unit based at least in part on a type of the one or more downlink signals, the remote unit processing capability, or both, wherein the one or more processed signals includes at least a second portion that results from the processing of the one or more downlink signals; and
transmitting the second portion of the one or more processed signals as one or more processed downlink signals from the remote unit to the distributed unit.

17. The method of claim 16, wherein the one or more downlink signals comprise one or more of a downlink shared channel transmission, a downlink control channel transmission, a broadcast channel transmission and processing the one or more downlink signals further comprises:
processing the one or more downlink signals by encoding, precoding, applying transmit diversity, or a combination thereof to the one or more downlink signals based at least in part on the remote unit processing capability.

18. The method of claim 16, wherein the one or more downlink signals comprise one or more of a primary synchronization signal, a secondary synchronization signal, a channel state information reference signal and processing the one or more downlink signals further comprises:
processing the one or more downlink signals using sequence generation, precoding, applying transmit diversity, or a combination thereof to the one or more downlink signals based at least in part on the remote unit processing capability.

19. The method of claim 1, wherein the first processing capability comprises support for processing at a higher physical layer, a lower physical layer, and a radio frequency layer at the remote unit and the second processing capability comprises support for processing at the lower physical layer, and the radio frequency layer at the remote unit.

20. A method for wireless communications at a distributed unit of a base station, comprising:
accepting, at the distributed unit and from a remote unit of the base station, a message indicating that the remote unit supports a remote unit processing capability that is one of a first processing capability or a second processing capability, wherein the first processing capability corresponds to additional physical layer signal processing at the remote unit than does the second processing capability;
determining to communicate with the remote unit based at least in part on the remote unit processing capability;
accepting, at the distributed unit, one or more processed uplink signals from the remote unit via an application programming interface that supports both the first processing capability and the second processing capability; and
forwarding, to the remote unit, one or more processed downlink signals via the application programming interface.

21. The method of claim 20, wherein accepting the one or more processed uplink signals further comprises:
accepting an indication of frequency domain momentary amplitude samples (I/Q samples) or channel estimates associated with the one or more uplink signals, wherein the indication comprises a frequency domain I/Q sample or channel estimate per antenna of the remote unit, and wherein the application programming interface supports reception of the indication in accordance with either the first processing capability or the second processing capability.

22. The method of claim 20, wherein accepting the one or more processed uplink signals further comprises:
accepting an indication of a signal-to-noise ratio, a reference signal received power, a rank, timing advance information, a list of user equipments (UEs), a precoding matrix, a digital beamforming matrix, or a combination thereof associated with each of the one or more processed uplink signals, wherein the application programming interface supports reception of the indication in accordance with the first processing capability.

23. The method of claim 20, wherein accepting the one or more processed uplink signals further comprises:
accepting an indication of a reference signal received power, a timing advance, an angle of arrival, or a combination thereof associated with the UE, wherein the application programming interface supports reception of the indication in accordance with the first processing capability.

24. The method of claim 20, wherein accepting the one or more processed uplink signals further comprises:
accepting an indication of pre-filtered frequency domain momentary amplitude samples (I/Q samples) associated with the one or more processed uplink signals, wherein the application programming interface supports reception of the indication in accordance with the second processing capability.

25. The method of claim 20, wherein accepting the one or more processed uplink signals further comprises:
accepting an indication of a demodulated log-likelihood ratios associated with the one or more processed uplink signals, wherein each demodulated log-likelihood ratio is associated with a physical layer, and wherein the application programming interface supports reception of the indication in accordance with the second processing capability.

26. The method of claim 25, further comprising:
decoding the one or more processed uplink signals in accordance with the indication of the demodulated log-likelihood ratios associated with the one or more processed uplink signals.

27. The method of claim 20, further comprising:
processing the one or more processed uplink signals in accordance with the remote unit processing capability included in the message received from the remote unit, wherein the remote unit processing capability is the first processing capability.

28. The method of claim 20, further comprising:
performing demodulation and decoding of the of the one or more processed uplink signals in accordance with the second processing capability.

29. The method of claim 20, wherein the one or more processed uplink signals are based at least in part on the remote unit processing capability, a fronthaul capacity, a signaling type associated with the one or more processed uplink signals, or a combination thereof.

30. An apparatus for wireless communications, comprising:
a processor;
memory coupled with the processor; and
instructions stored in the memory and executable by the processor to cause the apparatus to:
reporting, from a remote unit to a distributed unit of a base station, a message indicating that the remote unit supports a remote unit processing capability that is one of a first processing capability or a second processing capability, wherein the first processing capability corresponds to additional physical layer signal processing at the remote unit than does the second processing capability;
process one or more signals in accordance with the remote unit processing capability included in the message transmitted to the distributed unit, the processing resulting in one or more processed signals, wherein at least a first portion of the one or more processed signals results from processing of uplink signals of the one or more signals; and
forward the first portion of the one or more processed signals as corresponding one or more processed uplink signals from the remote unit to the distributed unit via an application programming interface that supports both the first processing capability and the second processing capability.

31. An apparatus for wireless communications, comprising:
a processor;
memory coupled with the processor; and
instructions stored in the memory and executable by the processor to cause the apparatus to:
accept, at a distributed unit and from a remote unit of a base station, a message indicating that the remote unit supports a remote unit processing capability that is one of a first processing capability or a second processing capability, wherein the first processing capability corresponds to additional physical layer signal processing at the remote unit than does the second processing capability;
determine to communicate with the remote unit based at least in part on the remote unit processing capability;
accept, at the distributed unit, one or more processed uplink signals from the remote unit via an application programming interface that supports both the first processing capability and the second processing capability; and
forwarding, to the remote unit, one or more processed downlink signals via the application programming interface.

* * * * *